US008107806B2

United States Patent
Uenishi

(10) Patent No.: US 8,107,806 B2
(45) Date of Patent: Jan. 31, 2012

(54) FOCUS ADJUSTMENT APPARATUS AND FOCUS ADJUSTMENT METHOD

(75) Inventor: Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/854,403

(22) Filed: Aug. 11, 2010

(65) Prior Publication Data

US 2011/0044675 A1 Feb. 24, 2011

(30) Foreign Application Priority Data

Aug. 18, 2009 (JP) ................. 2009-189496

(51) Int. Cl.
- G03B 3/10 (2006.01)
- G03B 13/34 (2006.01)
- G03B 15/16 (2006.01)
- H04N 5/232 (2006.01)
- G02B 7/04 (2006.01)

(52) U.S. Cl. .......... 396/95; 396/123; 396/124; 396/125; 348/352; 348/354; 348/356; 250/201.2

(58) Field of Classification Search ........... 396/95, 396/123–125; 348/345, 348, 349, 352, 354–356; 250/201.2, 201.4, 201.7, 201.8

See application file for complete search history.

(56) References Cited

U.S. PATENT DOCUMENTS

| 2006/0115297 | A1 | 6/2006 | Nakamaru |
| 2008/0008361 | A1 | 1/2008 | Nozaki |
| 2009/0116830 | A1* | 5/2009 | Kumagai ............... 396/125 |

FOREIGN PATENT DOCUMENTS

| JP | 2006-157428 A | 6/2006 |
| JP | 2007-282119 A | 10/2007 |

* cited by examiner

*Primary Examiner* — Rochelle-Ann J Blackman

(74) *Attorney, Agent, or Firm* — Canon U.S.A., Inc. IP Division

(57) ABSTRACT

A focus adjustment apparatus includes an imaging unit configured to capture an object image input via a focus lens to output image data, a focus adjustment unit configured to perform focus adjustment by controlling a position of the focus lens based on the image data, a motion detection unit configured to detect a motion of the object image based on the image data, and a control unit configured to control the focus adjustment unit to perform a first focus adjustment operation if motion of the object image is not detected by the motion detection unit, and to control the focus adjustment unit to perform a second focus adjustment operation different from the first focus adjustment operation if motion of the object image is detected by the motion detection unit.

15 Claims, 22 Drawing Sheets

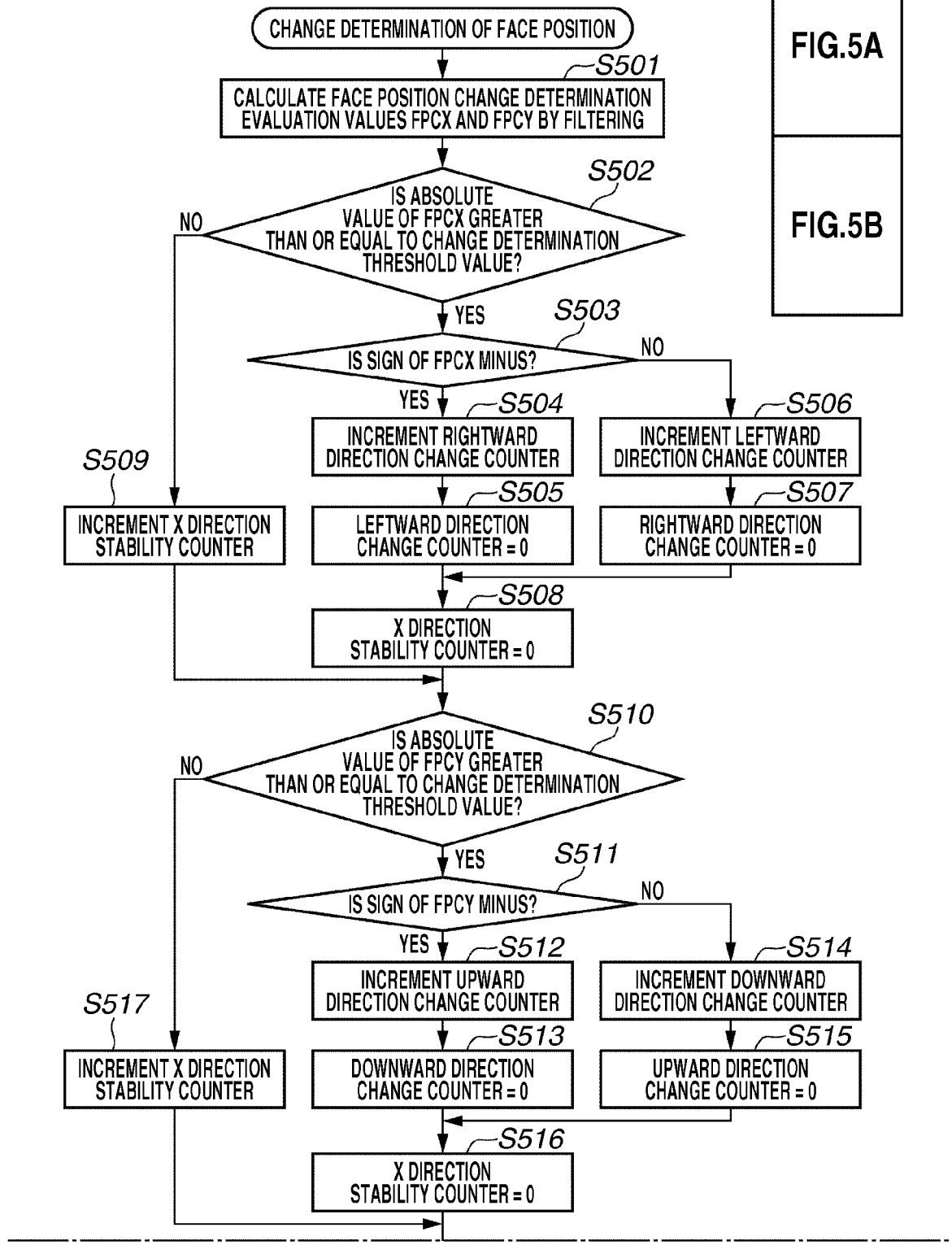

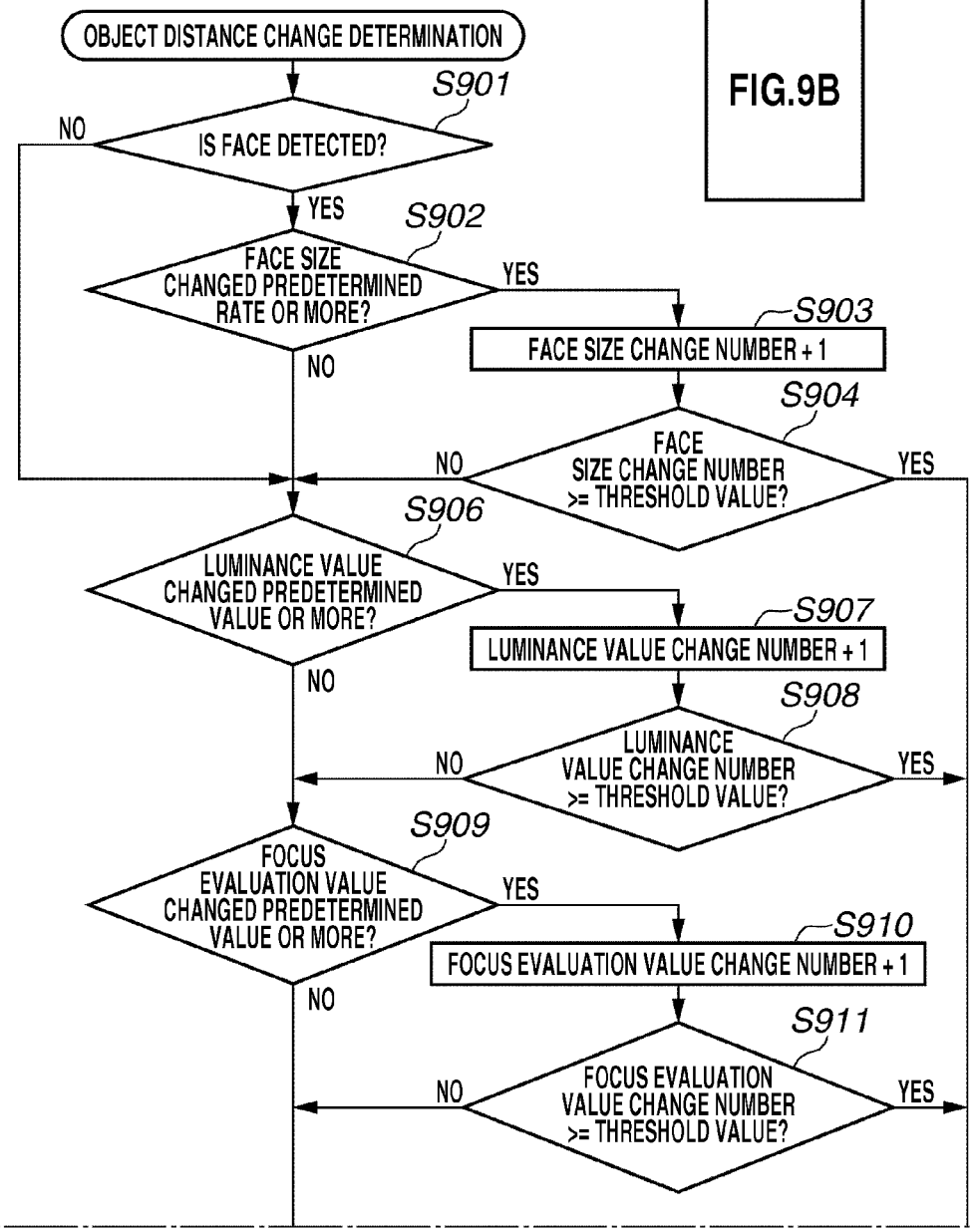

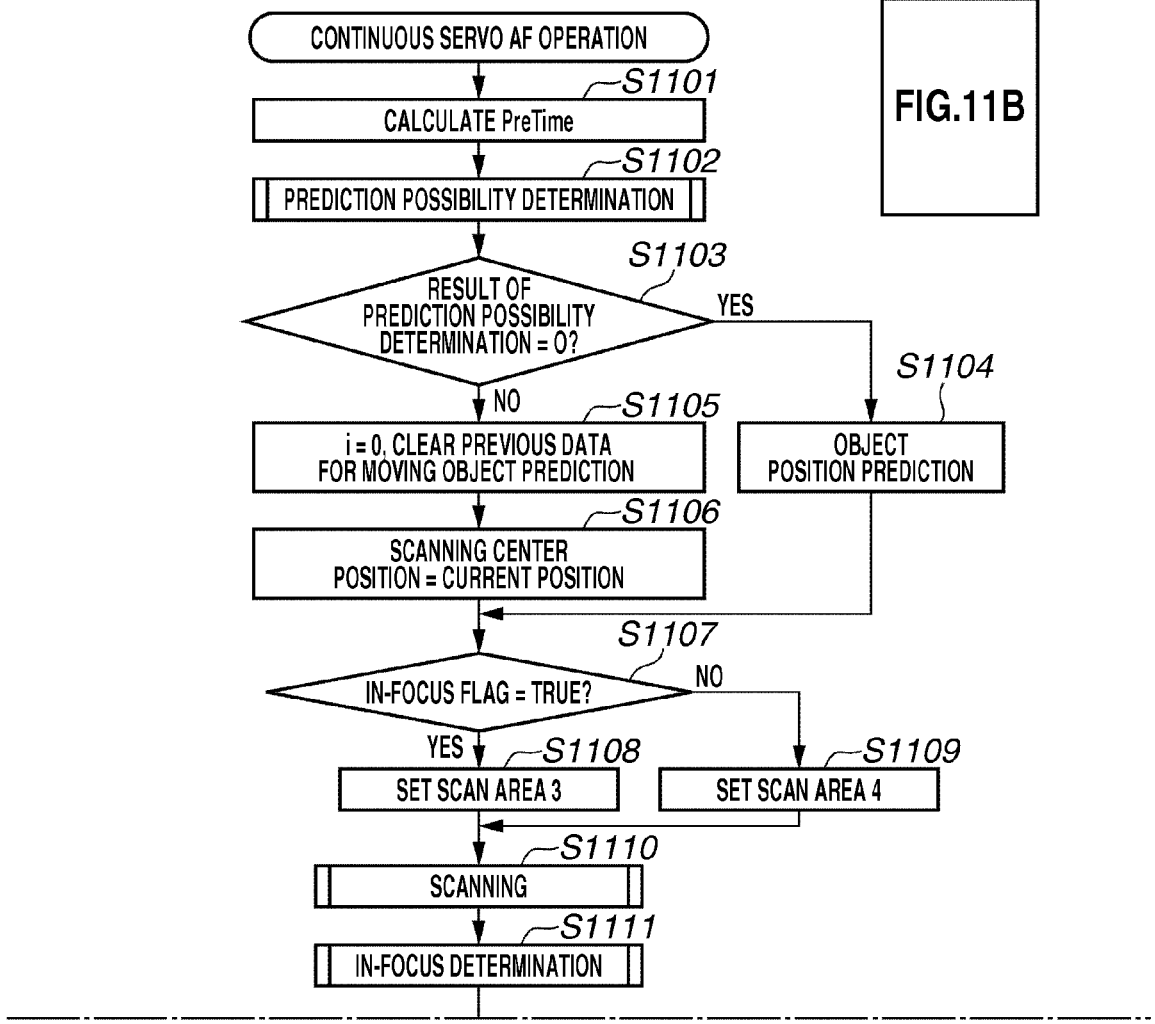

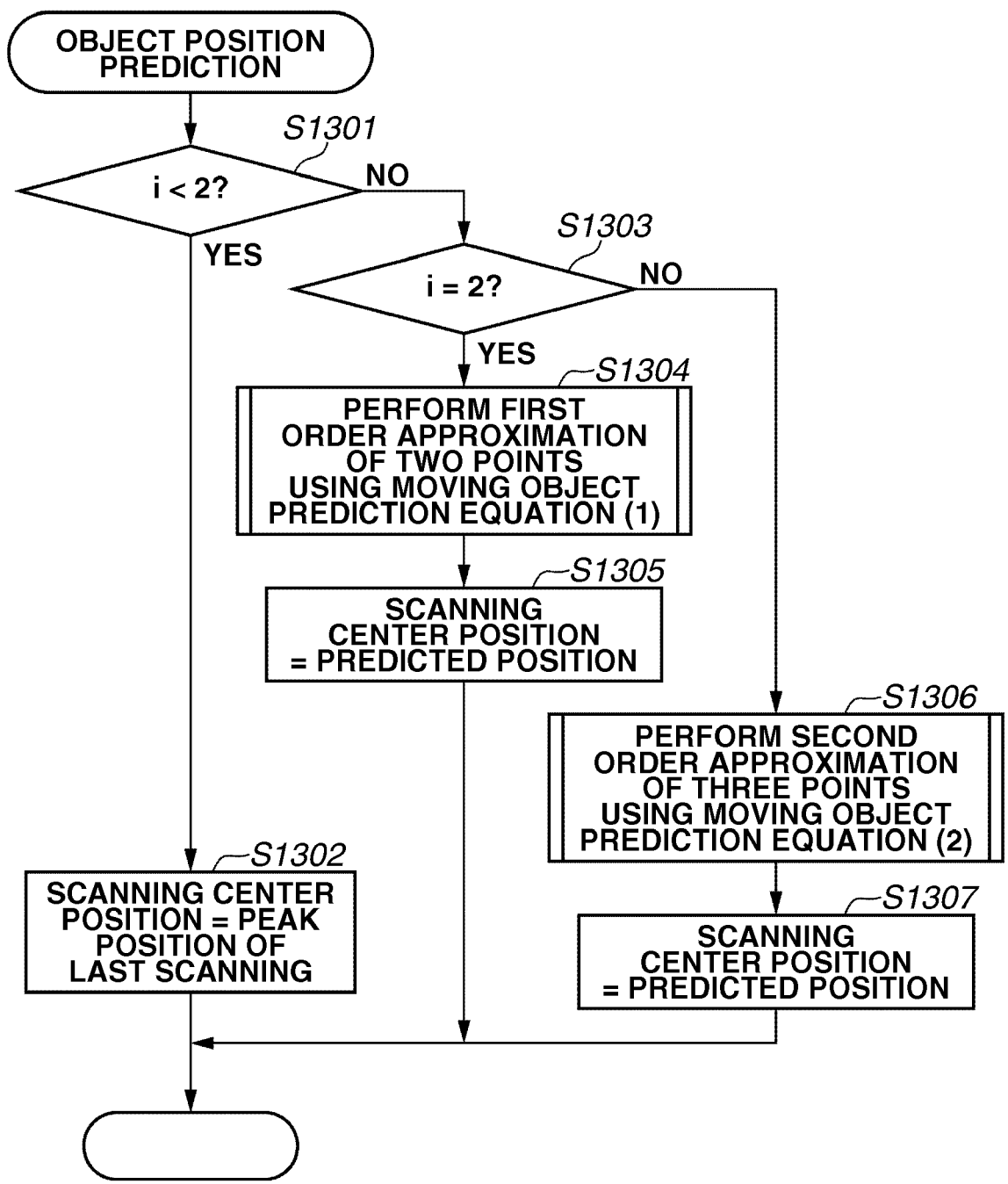

SL = SL1+SL2

FOCUS ADJUSTMENT APPARATUS AND FOCUS ADJUSTMENT METHOD

BACKGROUND OF THE INVENTION

1. Field of the Invention

The present invention relates to a technique used for adjusting focus of an imaging unit to which an object image is input via a focus lens.

2. Description of the Related Art

Conventionally, electronic still cameras use autofocus (AF) methods in moving a position of a focus lens and focusing on an object. According to the AF methods, focusing operations are automatically performed using a luminance signal acquired from an image sensor such as a charge-coupled device (CCD). An automatic focusing apparatus using the AF method generally acquires an in-focus point by using an AF evaluation value. The AF evaluation value is obtained by integrating a high-frequency component of a luminance signal in a focusing area set in each image plane. According to the AF evaluation value, a focus lens position with the highest contrast is detected. Then, the in-focus point is acquired from the detected lens position.

The hill-climbing method (hereinafter referred to as continuous AF) is known among the AF methods. According to the continuous AF, the focus lens moves in the direction where the AF evaluation value increases so that a position with the maximum AF evaluation value is detected. The detected point is determined to be an in-focus position. If the focus lens moves slowly in the direction where the AF evaluation value increases according to this method, the object can be focused without reducing the quality of a live image. However, if the object moves a great deal toward or away from the camera, accuracy of the focus tracking is decreased.

The focus tracking of an object moving a great deal toward or away from the camera can be improved if the drive speed of the focus lens is increased. As an AF method for improving focus tracking of such an object, a method that tracks an in-focus point by continuously and rapidly driving the focus lens in a range based on the in-focus points detected in the past has been developed. This method is referred to as servo AF in the following description. However, in improving the focus tracking with respect to an object which is moving a great deal toward or away from the camera, the focus change per unit time is increased, and accordingly, the quality of a live image becomes poor.

Japanese Patent Application Laid-Open No. 2007-282119 discusses an electronic camera which detects a state of a main object (person) and controls the image capturing operation according to the detected state. Japanese Patent Application Laid-Open No. 2006-157428 discusses a photographing apparatus which predicts motion of an object and motion of the photographing apparatus. Various image capturing conditions including shutter speed, aperture value, sensitivity, and flash condition are set according to the predicted motion of the object.

According to the technique discussed in Japanese Patent Application Laid-Open No. 2007-282119, the state of the object being the main person is detected, and then the image capturing operation is controlled according to the detected state. However, since the AF control is not controlled according to the motion of the detected object, focus on a moving object is not tracked as desired. Further, in photographing an object which is not moving, the quality of a live image is decreased due to a change in focus.

According to the technique discussed in Japanese Patent Application Laid-Open No. 2006-157428, motion of an object and motion of the photographing apparatus are predicted and various image capturing conditions including shutter speed, aperture value, sensitivity, and flash condition are set according to the predicted motion of the object. However, since the AF control is not changed according to the motion of the detected object, focus on a moving object is not tracked as desired. Further, in photographing an object which is not moving, the quality of a live image is decreased due to a change in focus.

SUMMARY OF THE INVENTION

The present invention is directed to a focus adjustment apparatus capable of performing focus tracking on a moving object without reducing image quality of a live image.

According to an aspect of the present invention, a focus adjustment apparatus includes an imaging unit configured to capture an object image input via a focus lens to output image data, a focus adjustment unit configured to perform focus adjustment by controlling a position of the focus lens based on the image data, a motion detection unit configured to detect a motion of the object image based on the image data, and a control unit configured to control the focus adjustment unit to perform a first focus adjustment operation if motion of the object image is not detected by the motion detection unit, and to control the focus adjustment unit to perform a second focus adjustment operation different from the first focus adjustment operation if motion of the object image is detected by the motion detection unit.

According to another aspect of the present invention, a focus adjustment method includes detecting motion of an object image based on image data of the object image input to an imaging unit via a focus lens and output from the imaging unit, and controlling a focus adjustment unit configured to perform focus adjustment by controlling a position of the focus lens based on the image data to perform a first focus adjustment operation if the motion of the object image is not detected, and controlling the focus adjustment unit to perform a second focus adjustment operation different from the first focus adjustment operation if the motion of the object image is detected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 is a flowchart illustrating object position prediction processing.

DESCRIPTION OF THE EMBODIMENTS

Various exemplary embodiments, features, and aspects of the invention will be described in detail below with reference to the drawings.

Figure 1:
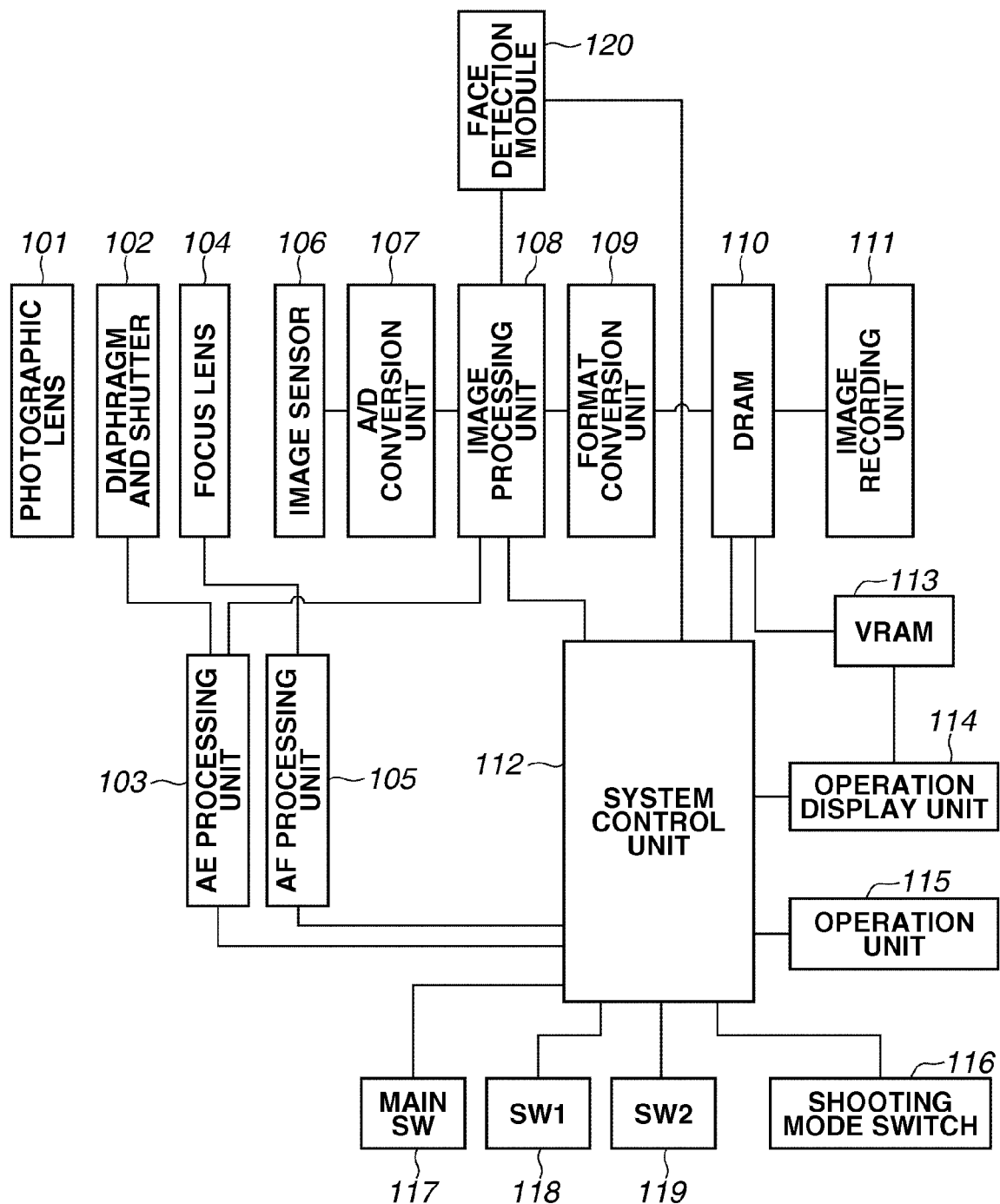
FIG. 1 is a block diagram illustrating a configuration of an electronic camera according to an exemplary embodiment of the present invention.

FIG. 1 is a block diagram illustrating a configuration of an electronic camera according to a first exemplary embodiment of the present invention. The electronic camera includes a photographic lens 101 having a zoom mechanism, a diaphragm and shutter 102 controlling the amount of light, an autoexposure (AE) processing unit 103, a focus lens 104 serving as a focusing optical system used for adjusting focus on an image sensor described below, an autofocus (AF) processing unit 105, an image sensor 106 converting the light reflected from an object and incident on the image sensor via the focus lens 104 into an electric signal.

The electronic camera further includes an A/D conversion unit 107, an image processing unit 108, a format conversion unit 109, an internal memory 110, and an image recording unit 111. The A/D conversion unit 107 includes a correlated double sampling (CDS) circuit for reducing noise output from the image sensor 106 and a nonlinear amplification circuit performed prior to A/D conversion. The internal memory 110 is a high speed memory (e.g., random access memory (DRAM)). The image recording unit 111 includes a recording medium such as a memory card and its interface The electronic camera further includes a system control unit 112 controlling a system of, for example, an image capturing sequence, an image display memory 113 (hereinafter referred to as VRAM), an operation display unit 114, and an operation unit 115. The operation display unit 114 displays an auxiliary operation and also a state of the man object indicating whether the main object is moving or not. Additionally, the operation display unit 114 displays a photographing screen and a focusing area during the image capturing operation. The operation unit 115 is used for externally operating the camera. Operations such as optical zoom and electronic zoom are performed by the operation unit 115.

The electronic camera further includes an shooting mode switch 116 used for turning on/off a face detection mode, a main switch 117 used for turning on the power to the system, a switch 118 (hereinafter referred to as SW1) used for standby operation of AF and AE, and a switch 119 (hereinafter referred to as SW2) used for image capturing after the operation of the SW1. A face detection module 120 is used for detecting a face using an image signal processed by the image processing unit 108 and transmitting one or a plurality pieces of face information (position/size information) to the system control unit 112. The configuration of the electronic camera according to the present embodiment is an example of the automatic focusing apparatus.

Figure 2:
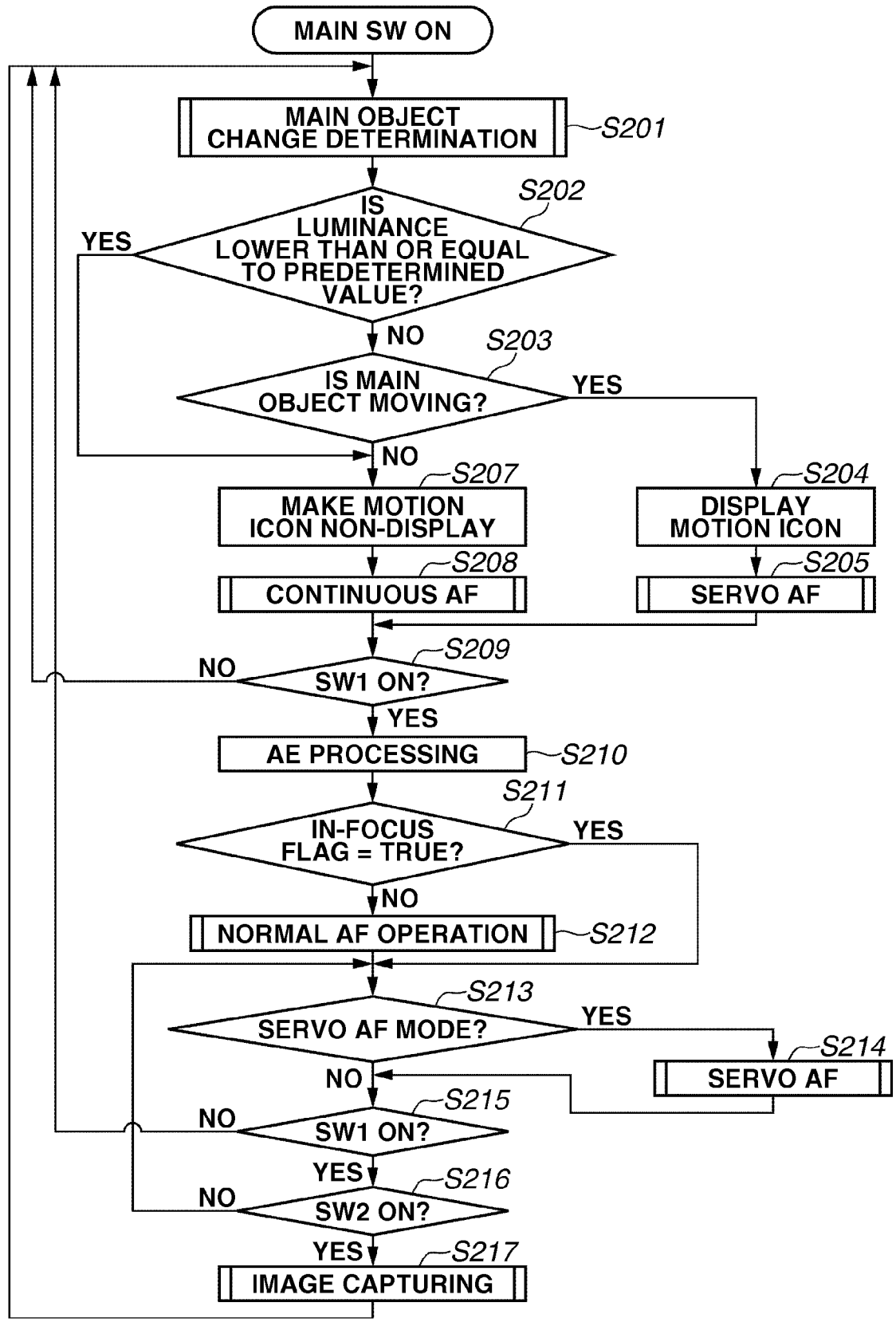
FIG. 2 is a flowchart illustrating an operation of the electronic camera according to a first exemplary embodiment of the present invention.

FIG. 2 is a flowchart illustrating an operation of the electronic camera according to the first exemplary embodiment of the present invention. First, when the user turns on the main switch 117, the processing proceeds to step S201. In step S201, the system control unit 112 determines whether a change has occurred in a main object according to the flowchart in FIG. 3 described below. In step S202, the system control unit 112 determines whether the luminance is less than or equal to a predetermined value. If the luminance is less than or equal to the predetermined value (YES in step S202), the processing proceeds to step S207. If the luminance is greater than the predetermined value (NO in step S202), the processing proceeds to step S203. Accordingly, regarding the servo AF described below, if the illuminance condition is low and the AF accuracy necessary in the servo AF is not acquired, the continuous AF is performed.

In step S203, the system control unit 112 determines whether the main object has been determined as moving according to a subroutine in step S201. If the main object has been determined as moving (YES in step S203), the processing proceeds to step S204. If not (NO in step S203), then the processing proceeds to step S207. In step S204, the system control unit 112 displays a motion icon, which indicates that the main object is moving, at a predetermined position on a screen, and the processing proceeds to step S205. In step S205, the system control unit 112 performs the servo AF processing according to the flowchart in FIG. 7 described below, and the processing proceeds to step S209.

In step S207, if a motion icon indicating that the main object is moving is displayed at a predetermined position on the screen, the system control unit 112 makes the display of the motion icon non-display, and the processing proceeds to step S208. In step S208, the system control unit 112 performs the continuous AF processing according to the flowchart in FIG. 6 described below, and the processing proceeds to step S209.

Steps S205 and S208 are processing examples performed by a focus adjustment unit, and step S201 is a processing example performed by a motion detection unit. Further, the processing for controlling the processing in step S205 or S208 according to a result of the change (motion) detected in the main object (object image) in step S201 is a processing example performed by a control unit. Furthermore, the continuous AF is processing being an application example of a first focus adjustment operation and the servo AF is processing being an application example of a second focus adjustment operation.

In step S209, the system control unit 112 determines the state of the switch SW1. If the switch is ON (YES in step S209), the processing proceeds to step S210. If not (NO in step S209), the processing returns to step S201. In step S210, the system control unit 112 instructs the AE processing unit 103 to perform the AE processing of the output of the image processing unit 108, and the processing proceeds to step S211.

In step S211, the system control unit 112 determines the state of an in-focus flag. If the in-focus flag is TRUE (YES in step S211), the processing proceeds to step S213. If the in-focus flag is FALSE (NO in step S211), the processing proceeds to step S212. In step S212, the system control unit 112 performs a normal AF operation according to the flowchart in FIG. 10 described below. In step S213, the system control unit 112 determines whether the servo AF mode is set. If the servo AF mode is set (YES in step S213), the processing proceeds to step S214. If the servo AF mode is not set (NO in step S213), the processing proceeds to step S215.

Figure 7:
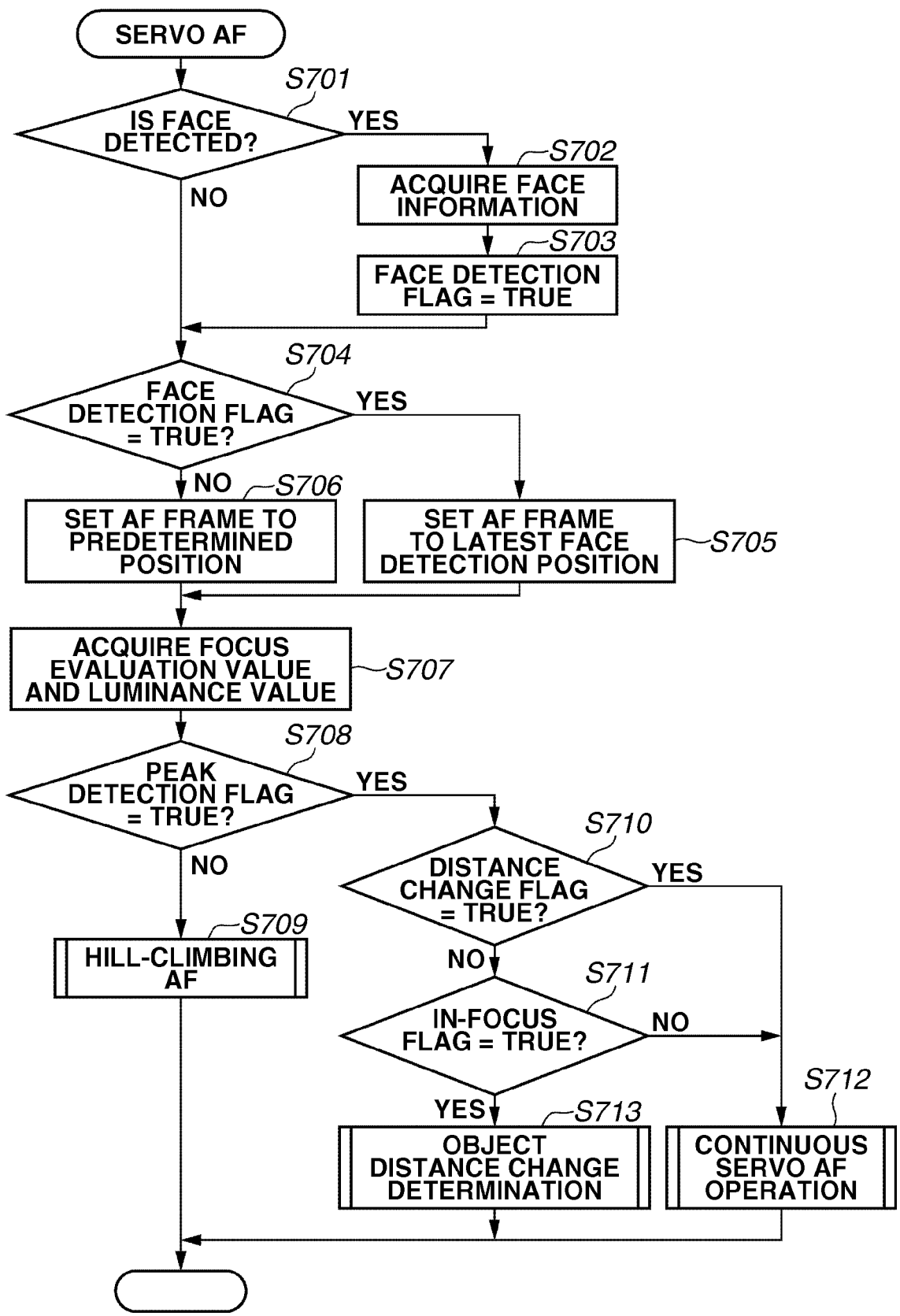
FIG. 7 is a flowchart illustrating servo AF processing.

In step S214, the system control unit 112 performs the servo AF according to the flowchart in FIG. 7 described below, and then the processing proceeds to step S215. In step S215, the system control unit 112 determines the state of the switch SW1. If the switch is ON (YES in step S215), the processing proceeds to step S216. If not (NO in step S215), the processing returns to step S201. In step S216, the system control unit 112 determines the state of the switch SW2. If the switch is ON (YES in step S216), the processing proceeds to step S217. If not (NO in step S216), the processing returns to step S213.

In step S217, the system control unit 112 performs the image capturing operation, and then the processing returns to step S201. According to the image capturing operation performed in step S217, after the image capturing standby operations for AF and AE are performed, an image is captured and processed, and then image data of the image-processed image data is transferred to an internal memory of the electronic camera or to an external storage medium set to the electronic camera, and then stored in the memory or the medium.

Figure 3:
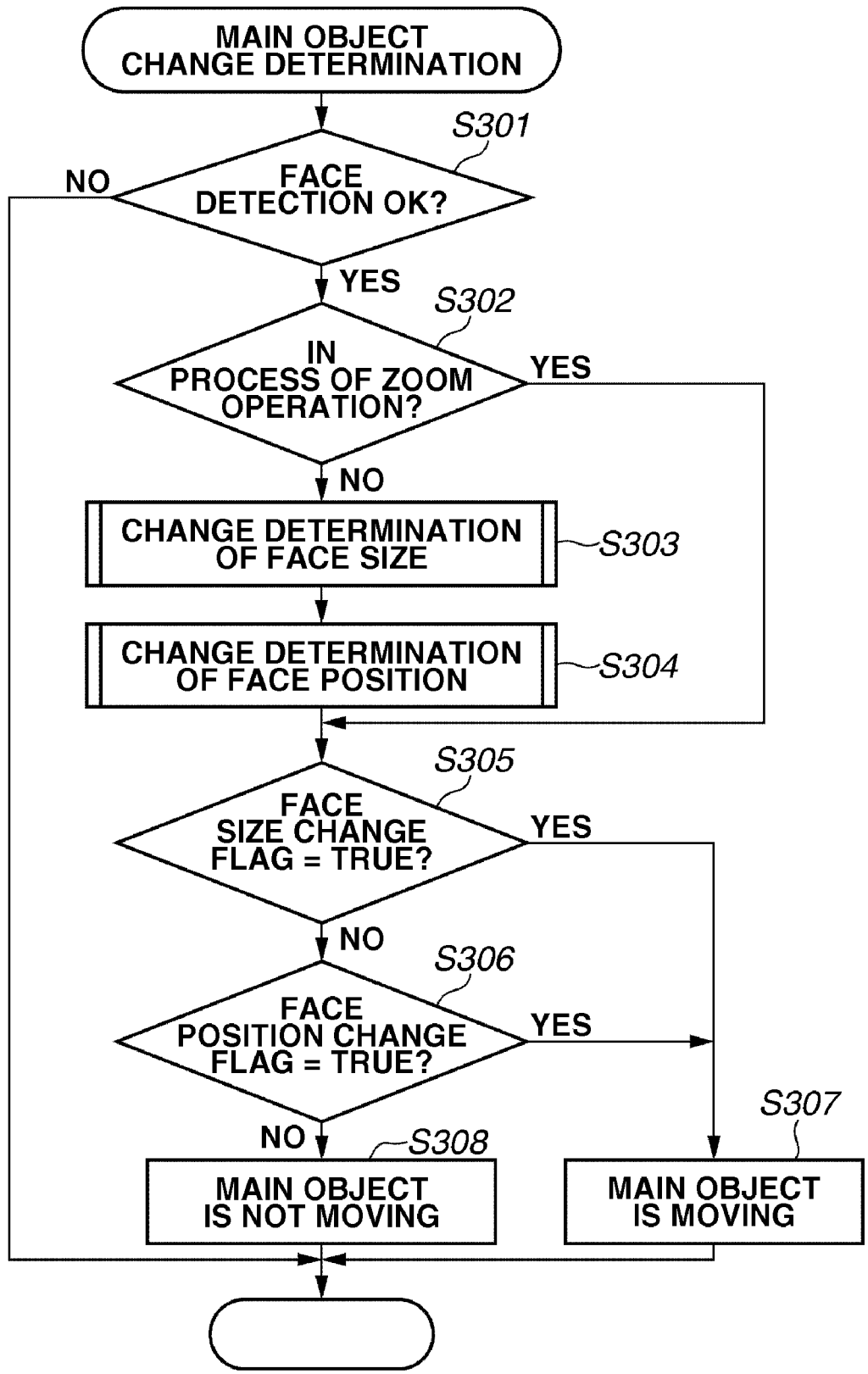
FIG. 3 is a flowchart illustrating change determination processing of a main object.

Next, a subroutine of the change determination of the main object performed in step S201 of the flowchart in FIG. 2 will be described with reference to the flowchart in FIG. 3.

In step S301, the system control unit 112 determines whether the face detection module 120 has detected a face. If a face has been detected (YES in step S301), the processing proceeds to step S302. If a face has not been detected (NO in step S301), the subroutine ends, and the processing proceeds to step S202 in FIG. 2. In step S302, the system control unit 112 determines whether the optical zoom operation using the photographic lens 101 or the electronic zoom operation is in process. If the optical zoom operation or the electronic zoom operation is in process (YES in step S302), the processing proceeds to step S305. If not (NO in step S302), the processing proceeds to step S303. If the optical zoom operation or the electronic zoom operation is in process, the face size or the face position in the screen changes even if the person being the object is not actually moving. For this reason, the change determination of the face size and the face position is not performed if the zoom operation is in process.

Figure 4:
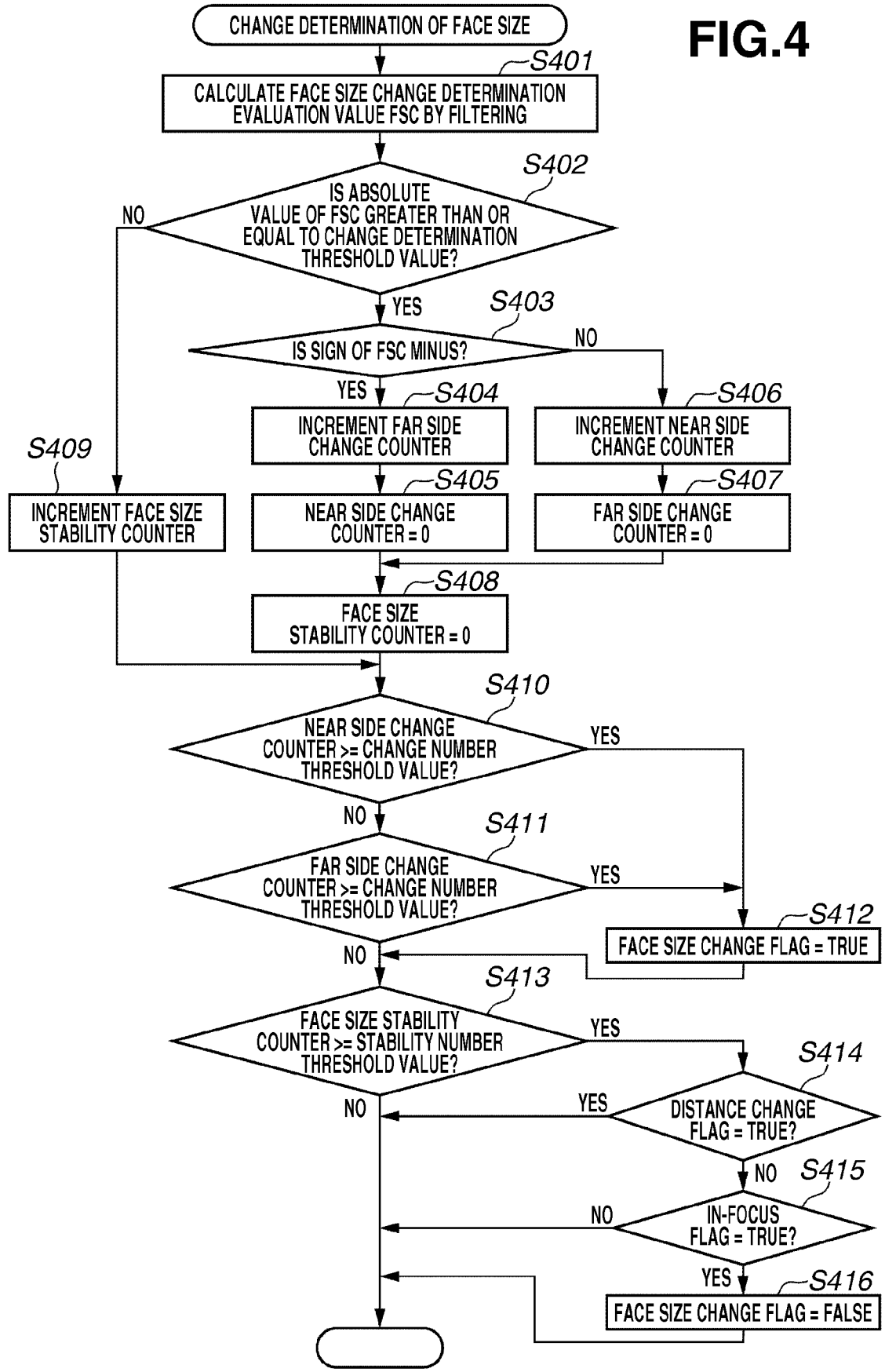
FIG. 4 is a flowchart illustrating face size change determination processing.

In step S303, the system control unit 112 determines whether the face size has changed according to the flowchart in FIG. 4 described below, and the processing proceeds to step S304. In step S304, the system control unit 112 determines whether the face position has changed according to the flowchart in FIG. 5 described below, and the processing proceeds to step S305. In step S305, the system control unit 112 determines whether a face size change flag is TRUE. If the face change flag is TRUE (YES in step S305), then the processing proceeds to step S307. If not (NO in step S3005), the processing proceeds to step S306.

In step S306, the system control unit 112 determines whether a face position change flag is TRUE. If the face position change flag is TRUE (YES in step S306), the processing proceeds to step S307. If not (NO in step S306), the processing proceeds to step S308. In step S307, the system control unit 112 determines that the main object is moving, and the processing of the subroutine ends. Then, the processing proceeds to step S202 in FIG. 2. In step S308, the system control unit 112 determines that the main object is not moving, and the processing of the subroutine ends. Then, the processing proceeds to step S202.

Next, a subroutine of the change determination of the face size in step S303 of the flowchart in FIG. 3 will be described with reference to the flowchart in FIG. 4.

In step S401, the system control unit 112 performs filtering of the face size information detected by the face detection module 120 in the time direction and calculates an evaluation value FSC used for determining the change in the face size, and the processing proceeds to step S402. The FSC indicates a degree of motion of the object toward or away from the camera. If the sign is plus, it indicates that the object is moving in a direction such that the size of the face is bigger, in other words, the object is moving to the near side. If the sign is minus, it indicates that the object is moving in a direction such that the face is smaller, in other words, the object is moving to the far side.

In step S402, the system control unit 112 determines whether an absolute value of the FSC is greater than or equal to a threshold value which is used in determining the change of the face and which has been set in advance. If the absolute value of the FSC is greater than or equal to the threshold value (YES in step S402), the processing proceeds to step S403. If not (NO in step S402), the processing proceeds to step S409. The threshold value used in the determination of the change is set to such a value that the system control unit 112 does not determine that the distance of the object is changed when the distance is not actually changed due to a face detection error. In step S403, the system control unit 112 determines whether the sign of the FSC is minus. If the sign is minus (YES in step S403), then the processing proceeds to step S404. If not (NO in step S403), the processing proceeds to step S406.

In step S404, the system control unit 112 increments a far side change counter by 1, and the processing proceeds to step S405. In step S405, the system control unit 112 sets a near side change counter to 0, and the processing proceeds to step S408. In step S406, the system control unit 112 increments the near side change counter by 1, and the processing proceeds to step S407. In step S407, the system control unit 112 sets the far side change counter to 0.

In step S408, the system control unit 112 sets a face size stability counter to 0, and the processing proceeds to step S410. In step S409, the system control unit 112 increments the face size stability counter by 1, and the processing proceeds to step S410.

In step S410, the system control unit 112 determines whether the value of the near side change counter is greater than or equal to a threshold value of a change number set in advance. If the value is greater than or equal to the threshold value of the change number (YES in step S410), the processing proceeds to step S412. If not (NO in step S410), the processing proceeds to step S411. The threshold value of the change number is set to such a value that a change due to a face detection error is not determined as a change in the face size. In step S411, the system control unit 112 determines whether a value of the far side change counter is greater than or equal to a threshold value of a change number. If the value of the far side change counter is greater than or equal to the threshold value of the change number (YES in step S411), the processing proceeds to step S412. If not (NO in step S411), then the processing proceeds to step S413.

In step S412, the system control unit 112 changes the face size change flag to TRUE, and the processing proceeds to step S413. In step S413, the system control unit 112 determines whether the value of the face size stability counter is greater than or equal to a threshold value of a stability number set in advance. If the value is greater than or equal to the threshold value of the stability number (YES in step S413), the processing proceeds to step S414. If not (NO in step S413), the processing of the subroutine ends. Then, the processing proceeds to step S304 in FIG. 3. The threshold value of the stability number is set to such a value that the object distance is not determined as stable, when the object distance is changing, due to error.

In step S414, the system control unit 112 determines whether a distance change flag, described below, is TRUE or not. If the distance change flag is TRUE (YES in step S414), the processing of the subroutine ends. Then, the processing proceeds to step S304 in FIG. 3. If not (NO in step S414), the processing proceeds to step S415. In step S415, the system control unit 112 determines whether the in-focus flag, described below, is TRUE or not. If the in-focus flag is TRUE (YES in step S415), then the processing proceeds to step S416. If not (NO in step S415), the processing of the subroutine ends. Then, the processing proceeds to step S304 in FIG. 3. In step S416, the system control unit 112 sets the face size change flag to FALSE, and the processing of the subroutine ends. Then, the processing proceeds to step S304 in FIG. 3.

Figure 5B:
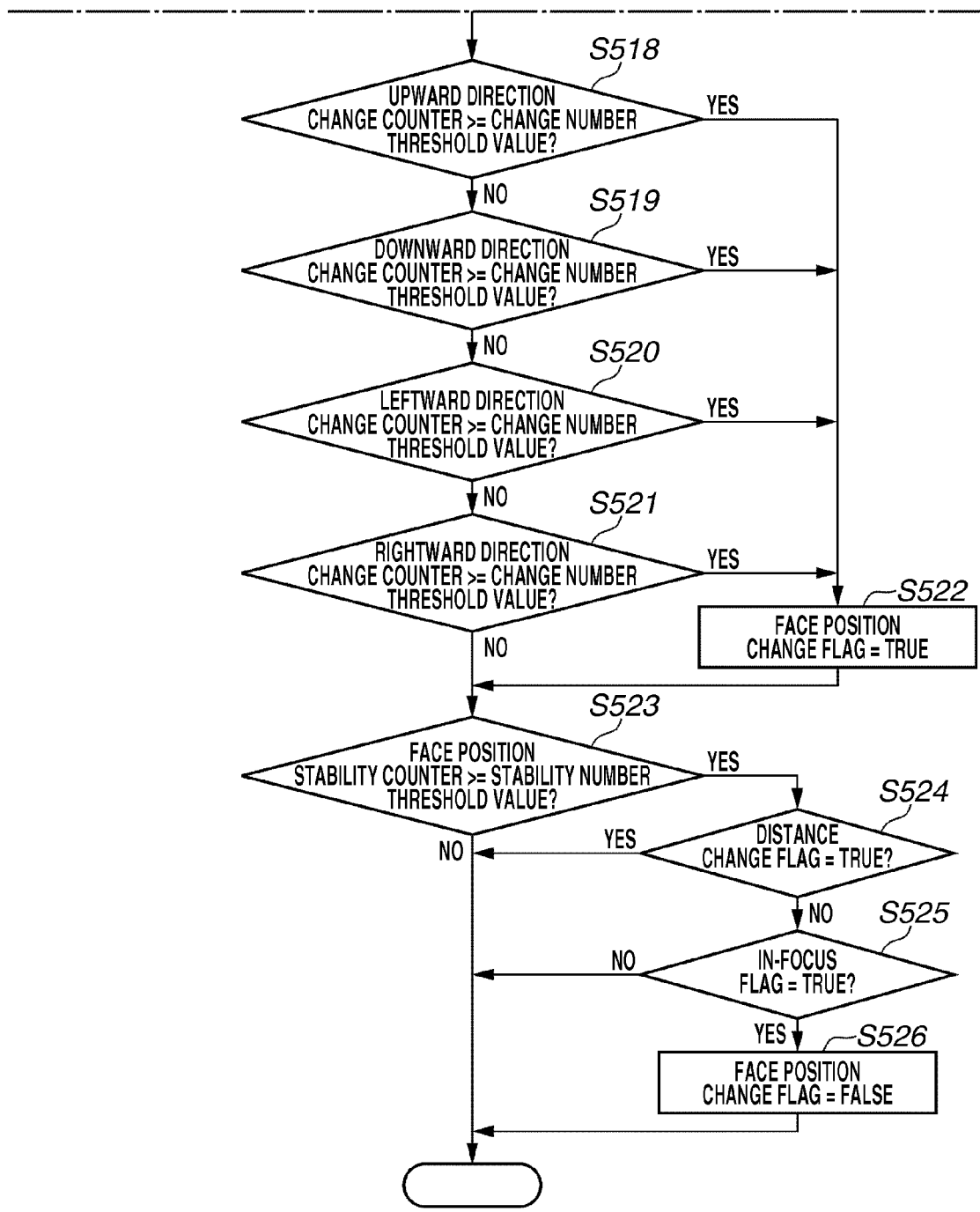
FIG. 5, composed of FIGS. 5A and 5B, is a flowchart illustrating face position change determination processing.

Now, the subroutine of the change determination of the face position in step S304 of the flowchart in FIG. 3 will be described with reference to the flowchart in FIG. 5.

In step S501, the system control unit 112 calculates evaluation values FPCX and FPCY used for determining a change in the face position by filtering X coordinate information and Y coordinate information of the face position detected by the face detection module 120 in the time direction, and then the processing proceeds to step S502. The FPCX indicates a degree of a horizontal motion of the object on the screen (i.e., side to side). If the sign is plus, the object is moving to the right side on the screen. If the sign is minus, the object is moving to the left side. Further, the FPCY indicates a degree of a vertical motion of the object on the screen (i.e. up or down). If the sign is plus, the object is moving upward on the screen. If the sign is minus, the object is moving downward.

In step S502, the system control unit 112 determines whether an absolute value of the FPCX is greater than or equal to a threshold value used in determining the change set in advance. If the absolute value of the FPCX is greater than or equal to the threshold value (YES in step S502), the processing proceeds to step S503. If not (NO in step S502), then the processing proceeds to step S509. The threshold value used in the determination of the change is set so to such a value that the system control unit 112 does not determine that the distance of the object is changed when the distance is not actually changed due to a face detection error or a screen motion due to camera shake.

In step S503, the system control unit 112 determines whether the sign of the FPCX is minus. If the sign is minus (YES in step S503), the processing proceeds to step S504. If not (NO in step S503), the processing proceeds to step S506. In step S504, the system control unit 112 increments a right direction change counter by 1, and the processing proceeds to step S505. In step S505, the system control unit 112 sets a left direction change counter to 0, and the processing proceeds to step S508.

In step S506, the system control unit 112 increments the left direction change counter by 1, and the processing proceeds to step S507. In step S507, the system control unit 112 sets the right direction change counter to 0, and the processing proceeds to step S508. In step S508, the system control unit 112 sets an X direction stability counter to 0, and the processing proceeds to step S510. In step S509, the system control unit 112 increments the X direction stability counter by 1, and the processing proceeds to step S510.

In step S510, the system control unit 112 determines whether an absolute value of the FPCY is greater than or equal to the threshold value used in determining the change set in advance. If the absolute value of the FPCX is greater than or equal to the threshold value (YES in step S510), the processing proceeds to step S511. If not (NO in step S510), then the processing proceeds to step S517. In step S511, the system control unit 112 determines whether the sign of the FPCY is minus. If the sign is minus (YES in step S511), the processing proceeds to step S512. If the sign is plus (NO in step S511), the processing proceeds to step S514. In step S512, the system control unit 112 increments an upward direction change counter by 1, and the processing proceeds to step S513. In step S513, the system control unit 112 sets a downward direction change counter to 0, and the processing proceeds to step S516.

In step S514, the system control unit 112 increments the downward direction change counter by 1, and the processing proceeds to step S515. In step S515, the system control unit 112 set the upward direction change counter to 0, and the processing proceeds to step S516. In step S516, the system control unit 112 sets the X direction stability counter to 0, and the processing proceeds to step S518. In step S517, the system control unit 112 increments the X direction stability counter by 1, and the processing proceeds to step S518.

In step S518, the system control unit 112 determines whether the value of the upward direction change counter is greater than or equal to a threshold value of a change number set in advance. If the value of the upward direction change counter is greater than or equal to the threshold value (YES in step S518), the processing proceeds to step S522. If not (NO in step S518), the processing proceeds to step S519. The threshold value used in the determination of the change is set to such a value that the system control unit 112 does not determine that the distance of the object is changed when the distance is not actually changed due to a face detection error or a screen motion due to camera shake.

In step S519, the system control unit 112 determines whether the value of the downward direction change counter is greater than or equal to the threshold value of the change number. If the value of the downward direction change counter is greater than or equal to the threshold value (YES in step S519), the processing proceeds to step S522. If not (NO in step S519), the processing proceeds to step S520. In step S520, the system control unit 112 determines whether the value of the left direction change counter is greater than or equal to the threshold value of the change number. If the value of the left direction change counter is greater than or equal to the threshold value (YES in step S520), the processing proceeds to step S522. If not, the processing proceeds to step S521.

In step S521, the system control unit 112 determines whether the value of the right direction change counter is greater than or equal to the threshold value of the change number. If the value of the right direction change counter is greater than or equal to the threshold value (YES in step S521), the processing proceeds to step S522. If not (NO in step S521), then the processing proceeds to step S523. In step S522, the system control unit 112 sets the face position change flag to TRUE, and the processing proceeds to step S523.

In step S523, the system control unit 112 determines whether the value of the face position stability counter is greater than or equal to the threshold value of the stability number of times set in advance. If the value of the face position stability counter is greater than or equal to the threshold value (YES in step S523), the processing proceeds to step S524. If not (NO in step S523), the processing of the subroutine ends. Then, the processing proceeds to step S305 in FIG. 3. The threshold value of the stability number is set to such a value that the object distance is not determined as stable, when the object distance is actually changing, due to error.

In step S524, the system control unit 112 determines whether the distance change flag described below is TRUE. If the distance change flag is TRUE (YES in step S524), the processing of the subroutine ends, and the processing proceeds to step S305 in FIG. 3. If not (NO in step S524), the processing proceeds to step S525. In step S525, the system control unit 112 determines whether the in-focus flag described below is TRUE. If the in-focus flag is TRUE (YES in step S525), the processing proceeds to step S526. If not (NO in step S525), the processing of the subroutine ends. Then, the processing proceeds to step S305 in FIG. 3. In step S526, the system control unit 112 sets the face position change flag to FALSE, and the subroutine ends. Then, the processing proceeds to step S305.

Next, a subroutine of the continuous AF processing in step S208 of the flowchart in FIG. 2 will be described with reference to the flowchart in FIG. 6. The continuous AF is an AF method that determines the next drive direction of the focus lens each time the focus lens is driven for a predetermined amount.

In step S601, the system control unit 112 determines whether the face detection module 120 has detected a face. If a face has been detected (YES in step S601), the processing proceeds to step S602. If a face has not been detected (NO in step S601), the processing proceeds to step S604. In step S602, the system control unit 112 acquires face information such as a position or a size of the face detected by the face detection module 120, and the processing proceeds to step S603.

In step S603, the system control unit 112 sets a face detection flag, which indicates that a face has been detected, to TRUE, and the processing proceeds to step S604. In step S604, the system control unit 112 determines whether the state of the face detection flag is TRUE. If the face detection flag is TRUE (YES in step S604), the processing proceeds to step S605. If the face detection flag is FALSE (NO in step S604), the processing proceeds to step S606. In step S605, the system control unit 112 sets the AF frame to the latest face-detected position, and then the processing proceeds to step S607. The size of the AF frame set to the face at this time can be a predetermined size or determined based on the size of the detected face.

In step S606, the system control unit 112 sets the AF frame to a predetermined position such as the central region, and the processing proceeds to step S607. In step S607, the system control unit 112 acquires a focus evaluation value and a luminance value in the AF frame set in step S605 or S606, and then the processing proceeds to step S608.

In step S608, the system control unit 112 determines a state of a peak detection flag. The peak detection flag indicates whether a peak has been detected by the hill-climbing AF in step S609 described below. If the peak detection flag is TRUE (YES in step S608), the processing proceeds to step S610. If the peak detection flag is FALSE (NO in step S608), the processing proceeds to step S609.

Figure 8:
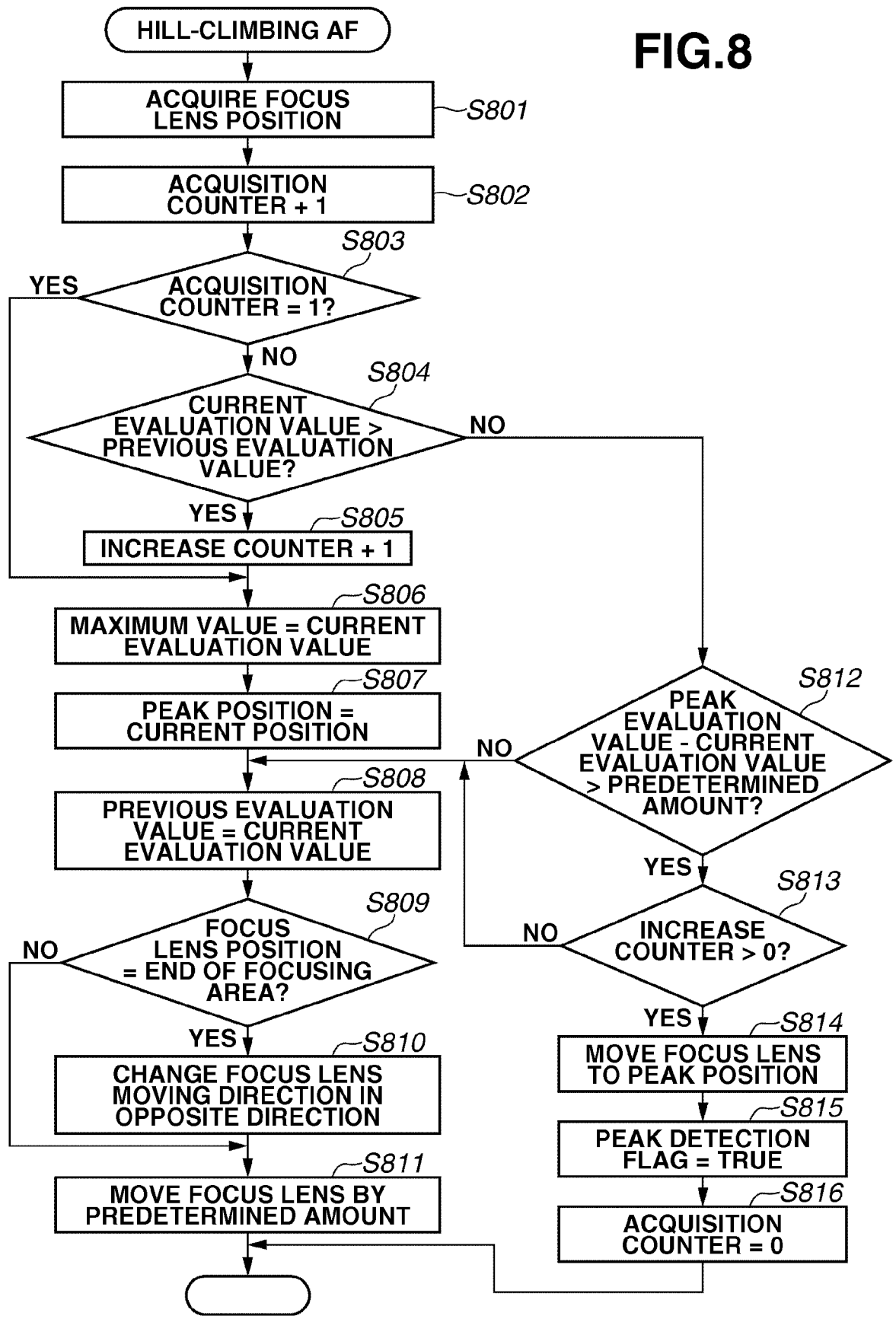
FIG. 8 is a flowchart illustrating hill-climbing AF processing.

In step S609, the system control unit 112 performs the hill-climbing AF according to a flowchart in FIG. 8 described below, and then the processing proceeds to step S209 in FIG. 2. In step S610, the system control unit 112 determines the change of the object distance according to the flowchart in FIG. 9 described below, and then the processing proceeds to step S611.

In step S611, the system control unit 112 determines a state of the distance change flag that indicates whether the object distance has changed (TRUE). If the distance change flag is TRUE (YES in step S611), the processing proceeds to step S612. If the distance change flag is FALSE (NO in step S611), the processing proceeds to step S613.

In step S612, the system control unit 112 sets the peak detection flag and the distance change flag to FALSE. Further, the system control unit 112 resets the maximum value and the peak position of the focus evaluation values used in the subroutine of the hill-climbing AF in step S609 and an increase counter that indicates the increase in the focus evaluation value, and then the processing proceeds to step S613. In step S613, the system control unit 112 stops the focus lens, and the processing proceeds to step S209 in FIG. 2.

Next, a subroutine of the servo AF processing in steps S205 and S214 of the flowchart in FIG. 2 will be described with reference to the flowchart in FIG. 7. The servo AF is an AF method used for driving a focus lens in a drive range according to an in-focus position detected in the past. The drive speed of the focus lens according to the servo AF is faster than the drive speed of the focus lens of the continuous AF (drive amount of focus lens per unit time is larger).

In step S701, the system control unit 112 determines whether the face detection module 120 has detected a face. If a face has been detected (YES in step S701), the processing proceeds to step S702. If a face has not been detected (NO in step S701), the processing proceeds to step S704. In step S702, the system control unit 112 acquires face information such as a position or a size of the face detected by the face detection module 120, and the processing proceeds to step S703. In step S703, the system control unit 112 sets the face detection flag, which indicates that a face has been detected, to TRUE, and the processing proceeds to step S704.

In step S704, the system control unit 112 determines whether the state of the face detection flag is TRUE. If the face detection flag is TRUE (YES in step S704), the processing proceeds to step S705. If the face detection flag is FALSE (NO in step S704), the processing proceeds to step S706. In step S705, the system control unit 112 sets the AF frame to the latest face detection position, and then the processing proceeds to step S707. The size of the AF frame when the face is detected can be a predetermined size or determined based on the size of the detected face.

In step S706, the system control unit 112 sets the AF frame to a predetermined position such as the central region, and the processing proceeds to step S707. In step S707, the system control unit 112 acquires a focus evaluation value and a luminance value in the AF frame set in step S705 or S706, and then the processing proceeds to step S708.

In step S708, the system control unit 112 determines a state of a peak detection flag. The peak detection flag indicates whether a peak has been detected by the hill-climbing AF in step S709 described below. If the peak detection flag is TRUE (YES in step S708), the processing proceeds to step S710. If the peak detection flag is FALSE (NO in step S708), the processing proceeds to step S709.

In step S709, the system control unit 112 performs the hill-climbing AF according to the flowchart in FIG. 8 described below. Then, the processing proceeds to step S209 or 5215 in FIG. 2. In step S710, the system control unit 112 determines whether the distance change flag, which indicates that the object distance has been changed, is TRUE. If the distance change flag is TRUE (YES in step S710), the processing proceeds to step S712. If the distance change flag is FALSE (NO in step S710), the processing proceeds to step S711.

In step S711, the system control unit 112 determines whether the in-focus flag is TRUE. If the in-focus flag is TRUE (YES in step S711), the processing proceeds to step S713. If the in-focus flag is FALSE (NO in step S711), the processing proceeds to step S712. In step S712, the system control unit 112 performs the continuous servo AF according to a flowchart in FIG. 11 described below, and the processing proceeds to step S209 or step S215 in FIG. 2. In step S713, the system control unit 112 performs the object distance change determination according to a flowchart in FIG. 9 described below, and then the processing proceeds to step S209 or step S215 in FIG. 2.

Next, a subroutine of the hill-climbing AF in step S609 of the flowchart in FIG. 6 and step S709 of the flowchart in FIG. 7 will be described with reference to the flowchart in FIG. 8.

In step S801, the system control unit 112 acquires a current position of the focus lens 104, and the processing proceeds to step S802. In step S802, the system control unit 112 increments an acquisition counter by 1, and the processing proceeds to step S803. The acquisition counter is used for counting a number of times a focus evaluation value, a luminance value, or a current position of the focus lens 104 has been acquired. The acquisition counter is set to 0 in advance according to an initialization operation (not shown).

In step S803, the system control unit 112 determines whether the value of the acquisition counter is 1. If the value of the acquisition counter is 1 (YES in step S803), the processing proceeds to step S806. If the value of the acquisition counter is not 1 (NO in step S803), the processing proceeds to step S804. In step S804, the system control unit 112 determines whether the "current focus evaluation value" is greater than the "previous focus evaluation value". If the "current focus evaluation value" is greater than the "previous focus evaluation value" (YES in step S804), the processing proceeds to step S805. If not (NO in step S804), the processing proceeds to step S812.

In step S805, the system control unit 112 increments an increase counter, which indicates that the "current focus evaluation value" is greater than the "previous focus evaluation value", by 1, and the processing proceeds to step S806. This increase counter is set in advance to 0 by initialization operation (not shown). In step S806, the system control unit 112 stores the current focus evaluation value as the maximum value of the focus evaluation values in a calculation memory (not shown) in the system control unit 112, and the processing proceeds to step S807.

In step S807, the system control unit 112 stores the current position of the focus lens 104 as the peak position of the focus evaluation values in a calculation memory (not shown) in the system control unit 112, and the processing proceeds to step S808. In step S808, the system control unit 112 stores the current focus evaluation value as the previous focus evaluation value in a calculation memory (not shown) in the system control unit 112, and the processing proceeds to step S809.

In step S809, the system control unit 112 determines whether the current position of the focus lens 104 is at the end of the focusing area. If the current position is at the end of the focusing area (YES in step S809), the processing proceeds to step S810. If the current position is not at the end of the focusing area (NO in step S809), the processing proceeds to step S811. In step S810, the system control unit 112 changes the moving direction of the focus lens 104 to the opposite direction, and the processing proceeds to step S811. In step S811, the system control unit 112 moves the focus lens 104 by a predetermined amount, and then the processing proceeds to step S209 or S215.

In step S812, the system control unit 112 determines whether "the maximum value of the focus evaluation values—the current focus evaluation value" is greater than a predetermined amount. If the obtained value is greater than the predetermined amount (YES in step S812), the processing proceeds to step S813. If not (NO in step S812), the processing proceeds to step S808. If "the maximum value of the focus evaluation values—the current focus evaluation value" is greater than the predetermined amount, in other words, if the predetermined amount or more is decreased from the maximum value, the maximum value is considered as the value of the peak position of the focus.

In step S813, the system control unit 112 determines whether the count of the increase counter is greater than 0. If the count of the increase counter is greater than 0 (YES in step S813), the processing proceeds to step S814. If not (NO in step S813), the processing proceeds to step S808. In step S814, the system control unit 112 moves the focus lens 104 to the peak position corresponding to the maximum value of the focus evaluation values stored in step S807, and the processing proceeds to step S815.

In step S815, the system control unit 112 sets the peak detection flag to TRUE, and the processing proceeds to step S816. In step S816, the system control unit 112 sets the acquisition counter to 0, and the processing proceeds to step S209 or S215 in FIG. 2.

Figure 9B:
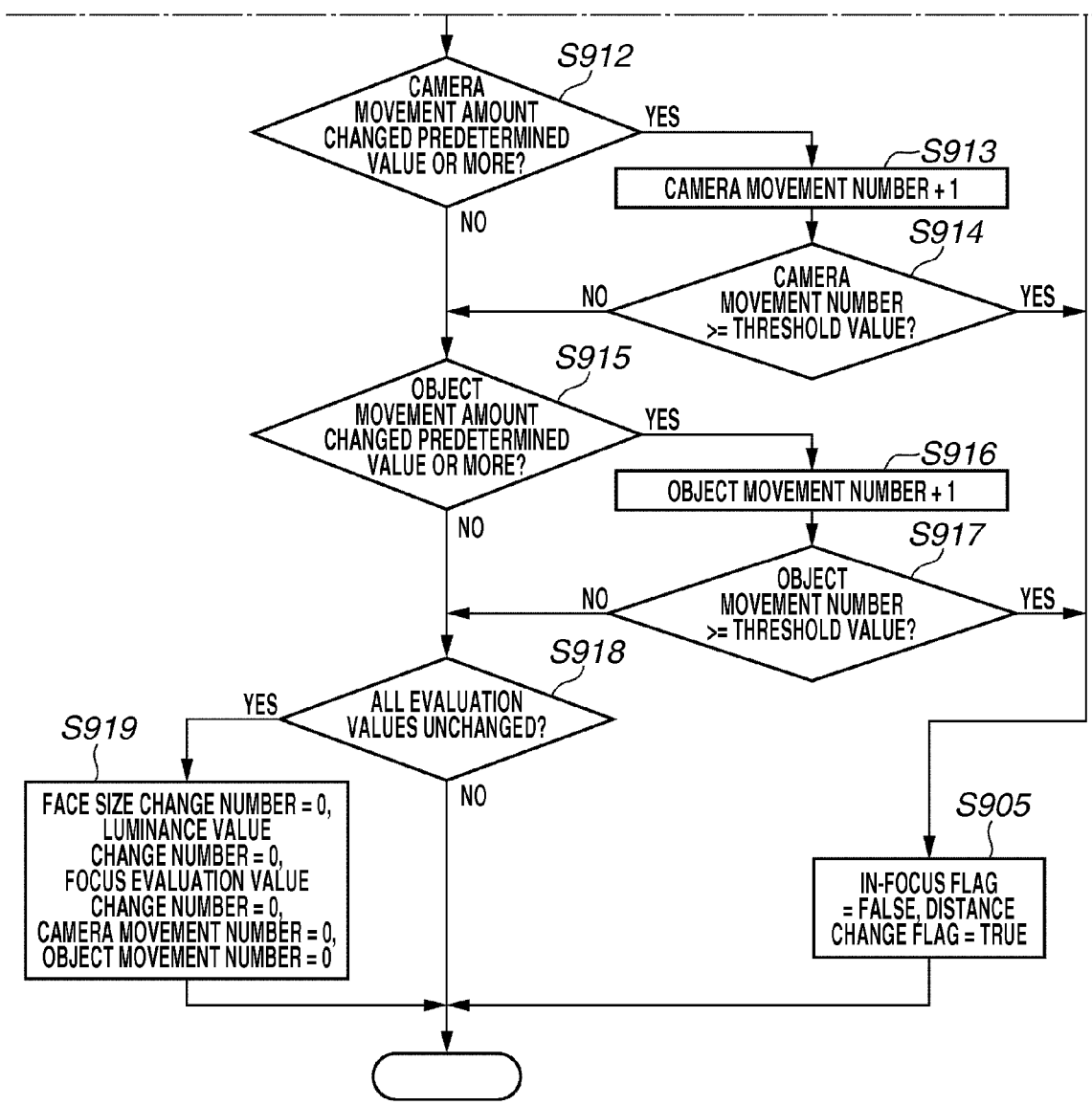
FIG. 9, composed of FIGS. 9A and 9B, is a flowchart illustrating object distance change determination processing.

Next, a subroutine of the object distance change determination performed in step S610 of the flowchart in FIG. 6 and step S713 of the flowchart in FIG. 7 will be described with reference to the flowchart in FIG. 9.

In step S901, the system control unit 112 determines whether the face detection module 120 has detected a face. If a face has been detected (YES in step S901), the processing proceeds to step S902. If a face has not been detected (NO in step S901), the processing proceeds to step S906. In step S902, the system control unit 112 determines whether the face size currently detected has changed a predetermined rate or more compared to the face size previously detected. If the face size has changed the predetermined rate or more (YES in step S902), the processing proceeds to step S903. If not (NO in step S902), the processing proceeds to step S906.

In step S903, the system control unit 112 increments a detected face size change number by 1, and the processing proceeds to step S904. In step S904, the system control unit 112 determines whether the detected face size change number is greater than or equal to a threshold value. If the detected face size change number is greater than or equal to the threshold value (YES in step S904, the processing proceeds to step S905. If not (NO in step S904), the processing proceeds to step S906. In step S906, the system control unit 112 determines whether the luminance value currently acquired has changed a predetermined value or more compared to the luminance value previously acquired. If the value has changed the predetermined value or more (YES in step S906), the processing proceeds to step S907. If not (NO in step S906), the processing proceeds to step S909.

In step S907, the system control unit 112 increments a luminance value change number by 1, and the processing proceeds to step S908. In step S908, the system control unit 112 determines whether the luminance value change number is greater than or equal to a threshold value. If the luminance value change number is greater than or equal to the threshold value (YES in step S908), the processing proceeds to step S905. If not (NO in step S908), then the processing proceeds to step S909. In step S909, the system control unit 112 determines whether the focus evaluation value currently acquired has changed a predetermined value or more compared to the focus evaluation value previously acquired. If the value has changed the predetermined value or more (YES in step S909), the processing proceeds to step S910. If not (NO in step S909), the processing proceeds to step S912.

In step S910, the system control unit 112 increments a focus evaluation value change number by 1, and the processing proceeds to step S911. In step S911, the system control unit 112 determines whether the focus evaluation value change number is greater than or equal to a threshold value. If the focus evaluation value change number is greater than or equal to the threshold value (YES in step S911), the processing proceeds to step S905. If not (NO in step S911), then the processing proceeds to step S912. In step S912, the system control unit 112 determines whether the camera movement detected by the angular velocity sensor unit 125 has changed a predetermined value or more. If the value has changed the predetermined value or more (YES in step S912), the processing proceeds to step S913. If not (NO in step S912), the processing proceeds to step S915.

In step S913, the system control unit 112 increments a camera movement number by 1, and the processing proceeds to step S914. In step S914, the system control unit 112 determines whether the camera movement number is greater than or equal to a threshold value. If the camera movement number is greater than or equal to the threshold value (YES in step S914), the processing proceeds to step S905. If not (NO in step S914), then the processing proceeds to step S915. In step S915, the system control unit 112 determines whether the movement amount of the object detected by the moving object detection unit 124 has changed a predetermined value or more. If the movement amount has changed the predetermined value or more (YES in step S915), the processing proceeds to step S916. If not (NO in step S915), the processing proceeds to step S918.

In step S916, the system control unit 112 increments an object movement number by 1, and the processing proceeds to step S917. In step S917, the system control unit 112 determines whether the object movement number is greater than or equal to a threshold value. If the object movement number is greater than or equal to the threshold value (YES in step S917), the processing proceeds to step S905. If not (NO in step S917), then the processing proceeds to step S918.

In step S905, the system control unit 112 sets the in-focus flag to FALSE, and the distance change flag to TRUE. Accordingly, the object distance change determination ends, and the processing proceeds to step S611 in FIG. 6 or step S209 or S215 in FIG. 2. In step S918, the system control unit 112 determines whether all of the evaluation values of the face detection size, the luminance value, and the focus evaluation value are unchanged, and the camera movement amount and the object movement amount are less than the predetermined values. If all of the evaluation values are unchanged and the operation amounts are less than the predetermined value (YES in step S918), the processing proceeds to step S919. If any of the evaluation values is changed or either of the operation amount is greater than or equal to the predetermined value (NO in step S918), the processing of the object distance change determination ends. Then, the processing proceeds to step S611 in FIG. 6 or step S209 or S215 in FIG. 2.

In step S919, the system control unit 112 sets the face size change number, the luminance value change number, the focus evaluation value change number, the camera movement number, and the object movement number to 0, and the processing of the object distance change determination ends. Then, the processing proceeds to step S611 in FIG. 6 or step S209 or S215 in FIG. 2.

Next, a subroutine of the normal AF operation in step S212 of the flowchart in FIG. 2 will be described with reference to the flowchart in FIG. 10.

In step S1001, the system control unit 112 determines whether the face detection module 120 has detected a face. If a face has been detected (YES in step S1001), the processing proceeds to step S1002. If a face has not been detected (NO in step S1001), the processing proceeds to step S1004. In step S1002, the system control unit 112 acquires face information such as a position or a size of the face detected by the face detection module 120, and the processing proceeds to step S1003.

In step S1003, the system control unit 112 sets the face detection flag, which indicates that a face has been detected, to TRUE, and the processing proceeds to step S1004. In step S1004, the system control unit 112 determines whether the state of the face detection flag is TRUE. If the face detection flag is TRUE (YES in step S1004), the processing proceeds to step S1005. If the face detection flag is FALSE (NO in step S1004), the processing proceeds to step S1006. In step S1005, the system control unit 112 sets the AF frame to the latest face-detected position, and then the processing proceeds to step S1007. The size of the AF frame set to the face at this time can be a predetermined size or determined based on the size of the detected face.

In step S1006, the system control unit 112 sets the AF frame to a predetermined position such as the central region, and the processing proceeds to step S1007. In step S1007, the system control unit 112 determines whether the AF mode is the continuous AF mode or a single AF mode. If the AF mode is the continuous AF mode (YES in step S1007), the processing proceeds to step S1008. If the AF mode is the single AF mode (NO in step S1007), the processing proceeds to step S1010.

In step S1008, the system control unit 112 determines whether the peak detection flag is TRUE. If the peak detection flag is TRUE (YES in step S1008), the processing proceeds to step S1011. If the peak detection flag is FALSE (NO in step S1008), the processing proceeds to step S1010. In step S1010, the system control unit 112 sets the scanning area setting to the entire area, and the processing proceeds to step S1012.

In step S1011, the system control unit 112 sets the scanning area to a predetermined area having the current position of the focus lens 104 at the center, and the processing proceeds to step S1012. In step S1012, the system control unit 112 performs the scanning according to a flowchart in FIG. 15 described below, and the processing proceeds to step S1013. In step S1013, the system control unit 112 performs in-focus determination according to the flowchart in FIG. 16 described below, and the processing proceeds to step S1014.

In step S1014, the system control unit 112 determines whether the result of the in-focus determination in step S1013 is O. If the in-focus determination is O (YES in step S1014), the processing proceeds to step S1015. If the in-focus determination is not O (NO in step S1014), the processing proceeds to step S1017. In step S1015, the system control unit 112 moves the focus lens 104 to the peak position calculated according to the scanning performed in step S1012, and the processing proceeds to step S1016. In step S1016, the system control unit 112 sets the peak detection flag and the in-focus flag to TRUE, and the distance change flag to FALSE. Then, the processing of the normal AF operation ends, and the processing proceeds to step S213 in FIG. 2.

In step S1017, the system control unit 112 moves the focus lens 104 to a position (fixed point) set in advance, and the processing proceeds to step S1018. The fixed point is set to a point where the possibility of the object is high. If a face has been detected, a point at a distance calculated by estimating a human figure from the size of the detected face can be used. In step S1018, the system control unit 112 sets the peak detection flag and the distance change flag to FALSE. Then the processing of the normal AF operation ends, and the processing proceeds to step S213 in FIG. 2.

Next, a subroutine of the continuous servo AF operation in step S712 of the flowchart in FIG. 7 will be described with reference to the flowchart in FIG. 11.

In step S1101, the system control unit 112 calculates time PreTime from the current time and the time period necessary in the scanning performed next time. The time PreTime is the time the focus lens 104 is positioned at the center of the scanning area in the scanning performed next time. Then, the processing proceeds to step S1102. The above-described scanning which is performed next time is the scanning performed in step S1110 described below. In step S1102, the system control unit 112 performs a prediction possibility determination according to a flowchart in FIG. 12 described below, and then the processing proceeds to step S1103.

In step S1103, the system control unit 112 determines whether the result of the prediction possibility determination performed in step S1102 is O. If the determination is O (YES in step S1103), the processing proceeds to step S1104. If the determination is not O (NO in step S1103), then the processing proceeds to step S1105. In step S1104, the system control unit 112 performs object position prediction according to a flowchart in FIG. 13 described below, and the processing proceeds to step S1107.

In step S1105, the system control unit 112 clears the previous data for motion prediction described below. The data which is cleared is ScanTime[0] to ScanTime [i−1] and HokanPeak[0] to HokanPeak[i−1]. Further, the system control unit 112 sets the number of times "i" to 0. The number of times "i" is the number of times the prediction possibility determination is consecutively determined as O. Then, the processing proceeds to step S1106. In step S1106, the system control unit 112 sets the current position of the focus lens 104 at the center of the scanning area, and the processing proceeds to step S1107.

In step S1107, the system control unit 112 determines whether the in-focus flag is TRUE. If the in-focus flag is TRUE (YES in step S1107), the processing proceeds to step S1108. If the in-focus flag is FALSE (NO in step S1107), then the processing proceeds to step S1109. In step S1108, the system control unit 112 sets the scanning area to a predetermined area, and the processing proceeds to step S1110.

In step S1109, the system control unit 112 sets the scanning area to an area larger than the predetermined area set in step S1108, and the processing proceeds to step S1110. In step S1110, the system control unit 112 performs scanning according to a flowchart in FIG. 15 described below. Then, the processing proceeds to step S1111. In step S1111, the system control unit 112 performs the in-focus determination according to the flowchart in FIG. 16 described below, and then the processing proceeds to step S1112.

In step S1112, the system control unit 112 determines whether the result of the in-focus determination performed in step S1111 is O. If the in-focus determination is O (YES in step S1112), the processing proceeds to step S1113. If the in-focus determination is not O (NO in step S1112), the processing proceeds to step S1125. In step S1113, the system control unit 112 sets the in-focus flag to TRUE, and the processing proceeds to step S1114. In step S1114, the system control unit 112 clears a counter counting a number of times the not-in-focus state is determined (Xcount) on a consecutive base to 0, and then the processing proceeds to step S1115.

In step S1115, the system control unit 112 determines whether a difference between the result of the scanning (peak position) performed in step S1110 and the center of the scanning area is smaller than or equal to a predetermined value. If the difference is smaller than the predetermined value (YES in step S1115), the processing proceeds to step S1116. If not (NO in step S1115), the processing proceeds to step S1119. In step S1116, the system control unit 112 increments a counter StCount by 1. The counter StCount is a number of times the difference between the peak position and the scanning center position calculated in step S1110 is consecutively smaller than the predetermined value. Then, the processing proceeds to step S1117.

In step S1117, the system control unit 112 determines whether the counter StCount is greater than or equal to the threshold value. If the counter StCount is greater than or equal to the threshold value (YES in step S1117), the processing proceeds to step S1118. If not (NO in step S1117), the processing proceeds to step S1120. In step S1118, the system control unit 112 determines that the distance change of the object is no longer determined, sets the distance change flag to FALSE, and the processing of the continuous servo AF operation ends. Then, the processing proceeds to step S209 or step S215 in FIG. 2. According to the above-described processing, if the object distance is not changed, the focus lens can be stopped without performing unnecessary scanning.

In step S1119, the system control unit 112 clears the counter StCount (StCount=0), and the processing proceeds to step S1120. In step S1120, the system control unit 112 determines whether the direction of the current peak position with respect to the current scanning center position in step S1110 is the same as the direction of the previous peak position with respect to the previous scanning center position. If the directions are the same (YES in step S1120), the processing proceeds to step S1121. If the directions are different (NO in step S1120), then the processing proceeds to step S1122.

In step S1121, the system control unit 112 sets a same direction movement flag to TRUE, and the processing proceeds to step S1123. In step S1122, the system control unit 112 changes the same direction movement flag to FALSE, and the processing proceeds to step S1123. In step S1123, the system control unit 112 sets the time the focus lens 104 is positioned at the center of the scanning area in the current scanning as ScanTime[i]. Further, the system control unit 112 sets the peak position obtained from the current scanning as HokanPeak[i]. Then, the processing proceeds to step S1124.

In step S1124, the system control unit 112 increments the number of times "i" by 1, and the processing of the servo AF operation ends. Then, the processing proceeds to step S209 or step S215 in FIG. 2. In step S1125, the system control unit 112 sets the in-focus flag to FALSE, and the processing proceeds to step S1126. In step S1126, the system control unit 112 increments the counter XCount by 1, and the processing proceeds to step S1127.

In step S1127, the system control unit 112 determines whether the XCount is greater than a predetermined value. If the XCount is greater than the predetermined value (YES in step S1127), the processing proceeds to step S1128. If not (NO in step S1127), the processing of the servo AF operation ends. Then, the processing proceeds to step S209 or step S215 in FIG. 2. In step S1128, the system control unit 112 sets the peak detection flag and the distance change flag to FALSE, and the processing of the servo AF operation ends. Then, the processing proceeds to step S209 or step S215 in FIG. 2.

Next, a subroutine of the prediction possibility determination performed in step S1102 of the flowchart in FIG. 11 will be described with reference to the flowchart in FIG. 12.

In step S1201, the system control unit 112 determines whether i=0. If i=0 (YES in step S1201), the processing proceeds to step S1205. If not (NO in step S1201), the processing proceeds to step S1202. In step S1202, the system control unit 112 determines whether the difference between PreTime and ScanTime [i−1] is shorter than a predetermined time. If the difference is shorter than the predetermined time (YES in step S1202), the processing proceeds to step S1203. If not (NO in step S1202), the processing proceeds to step S1205. According to the above-described processing, the time between the previous scanning and the present scanning can be determined, and the reliability of the prediction using the result of the previous scanning can be determined.

In step S1203, the system control unit 112 determines whether the same direction movement flag is TRUE. If the same direction movement flag is TRUE (YES in step S1203), the processing proceeds to step S1204. If the same direction movement flag is FALSE (NO in step S1203), the processing proceeds to step S1205. According to this processing, the prediction is performed only when the object is determined to move in the same direction toward or away from the camera. Thus, the possibility of a prediction error, which occurs when a result obtained from inappropriate focusing is used, can be reduced.

In step S1204, the system control unit 112 determines that the result of the prediction possibility determination is 0, and the processing of the prediction possibility determination ends. Then, the processing proceeds to step S1103 in FIG. 11. In step S1205, the system control unit 112 determines that the result of the prediction possibility determination is X, and the processing of the prediction possibility determination ends. Then, the processing proceeds to step S1103 in FIG. 11.

Figure 14A:
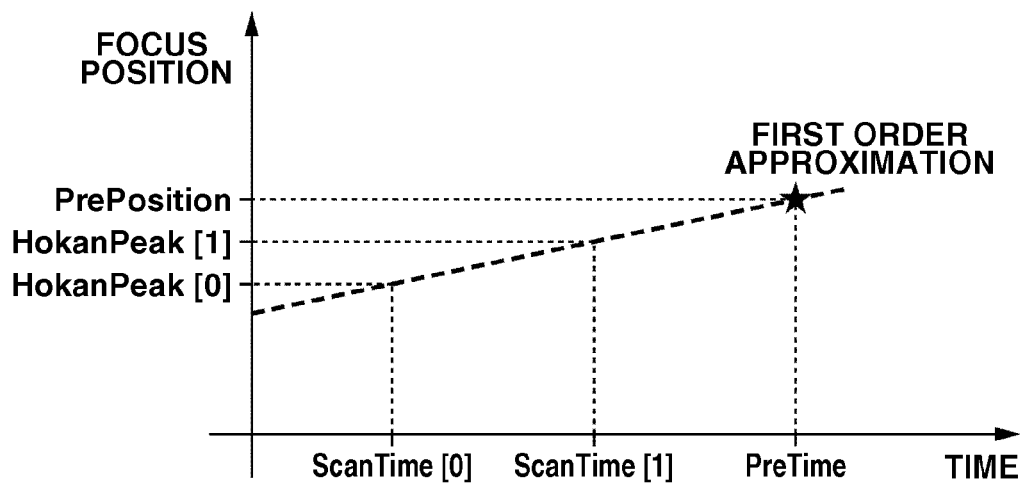
FIGS. 14A and 14B illustrate object position prediction processing.
Figure 14B:
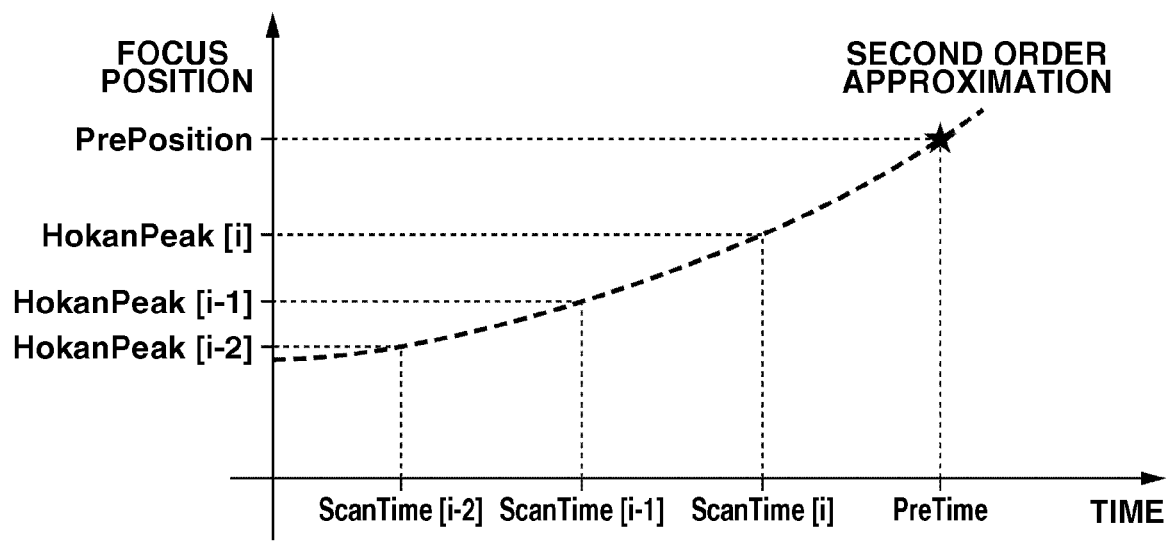

Next, a subroutine of the object position prediction performed in step S1104 of the flowchart in FIG. 11 will be described with reference to FIGS. 13, 14A, and 14B.

In step S1301, the system control unit 112 determines whether "i" is smaller than 2. If "i" is smaller than 2 (YES in step S1301), the processing proceeds to step S1302. If not (NO in step S1301), the processing proceeds to step S1303. In step S1302, the system control unit 112 sets the scanning center position to the peak position of the previous scanning, and the processing of the object position prediction ends. Then, the processing proceeds to step S1107 in FIG. 11. In step S1303, the system control unit 112 determines whether i=2. If i=2 (YES in step S1303), the processing proceeds to step S1304. If "i" is greater than 2 (NO in step S1303), the processing proceeds to step S1306.

In step S1304, the system control unit 112 calculates a predicted position PrePosition, which is a predicted position of the object at the time PreTime. The position PrePosition is calculated using two points (ScanTime[0],HokanPeak[0]) and (ScanTime[1],HokanPeak[1]) and according to the moving object prediction equation (1) below as illustrated in FIG. 14A, and the processing proceeds to step S1305.

$$\text{PrePosition} = (\text{PreTime} - \text{ScanTime}[0]) \times (\text{HokanPeak}[1] - \text{HokanPeak}[0]) / (\text{ScanTime}[1] - \text{ScanTime}[0]) + \text{HokanPeak}[0] \quad (1)$$

In step S1305, the system control unit 112 sets the position PrePosition (predicted position of the object calculated in step S1304) as the scanning center position, and the processing of the object position prediction flow ends. Then, the processing proceeds to step S1107 in FIG. 11. In step S1306, the system control unit 112 calculates the position PrePosition, which is a predicted position of the object at the time PreTime from three points (ScanTime[i−2], HokanPeak[i−2]), (ScanTime [i−1], HokanPeak[i−1]), and (ScanTime[i], HokanPeak[i]) and according to the moving object prediction equation (2) below as illustrated in FIG. 14B, and the processing proceeds to step S1307.

$$\begin{aligned} \text{PrePosition} &= (t3/t2) \times [(t3-t2) \times (t2 \times \text{Pos1} - t1 \times \text{Pos2})/t1/(t1-t2) + \text{Pos2}] + \text{HokanPeak}[i-2] \\ t1 &= \text{ScanTime}[i-1] - \text{ScanTime}[i-2] \\ t2 &= \text{ScanTime}[i] - \text{ScanTime}[i-2] \\ t3 &= \text{PreTime} - \text{ScanTime}[i-2] \\ \text{Pos1} &= \text{HokanPeak}[i-1] - \text{HokanPeak}[i-2] \\ \text{Pos2} &= \text{HokanPeak}[i] - \text{HokanPeak}[i-2] \end{aligned} \quad (2)$$

In step S1307, the system control unit 112 sets the position PrePosition (predicted position of the object calculated in step S1306) as the scanning center position, and the processing of the object position prediction flow ends. Then, the processing proceeds to step S1107 in FIG. 11.

Figure 15:
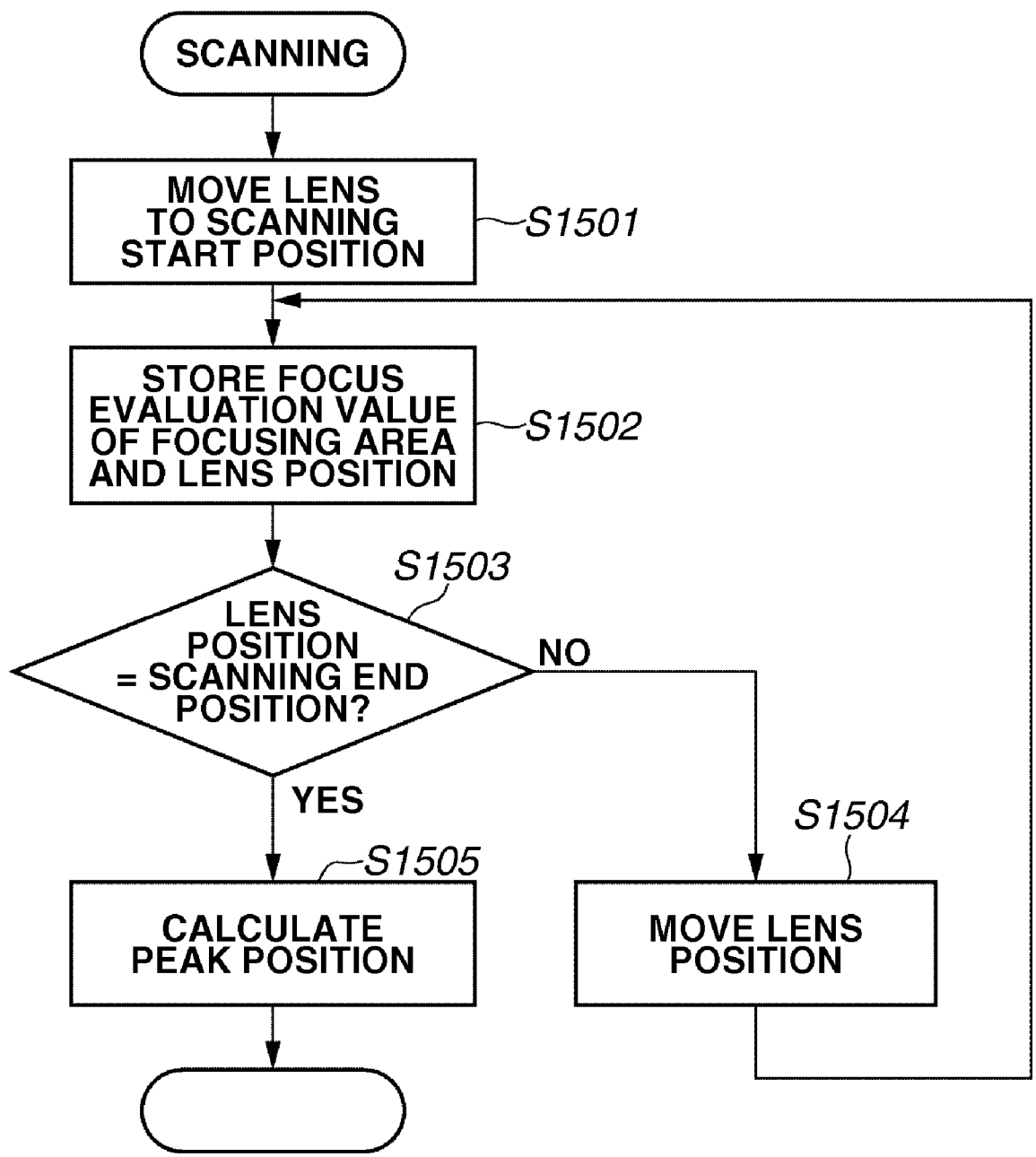
FIG. 15 is a flowchart illustrating scanning processing.

Next, a subroutine of the scanning operation performed in step S1012 of the flowchart in FIG. 10 and step S1110 of the flowchart in FIG. 11 will be described with reference to the flowchart in FIG. 15.

In step S1501, the system control unit 112 moves the focus lens 104 to a scanning start position. The scanning start position is set at one end of a scanning area that has been set. In step S1502, the system control unit 112 stores the focus evaluation value of the focusing area set in the photographing image plane and the position of the focus lens 104 in a calculation memory (not shown) in the system control unit 112.

In step S1503, the system control unit 112 determines whether the lens position is at a scanning end position. If the lens position is at the end position (YES in step S1503), the processing proceeds to step S1505. If not (NO in step S1503), the processing proceeds to step S1504. The scanning end position is set on the other end of the scanning area that has been set. In step S1504, the system control unit 112 drives and moves the focus lens 104 in a predetermined direction by a predetermined amount, and the processing returns to step S1502. In step S1505, the system control unit 112 calculates a peak position of the focus evaluation value from the focus evaluation values and the lens positions stored in step S1502.

Next, a subroutine of the in-focus determination in step S1013 of the flowchart in FIG. 10 and in step S1111 of the flowchart in FIG. 11 will be described with reference to FIGS. 16 and 17.

Figure 17:
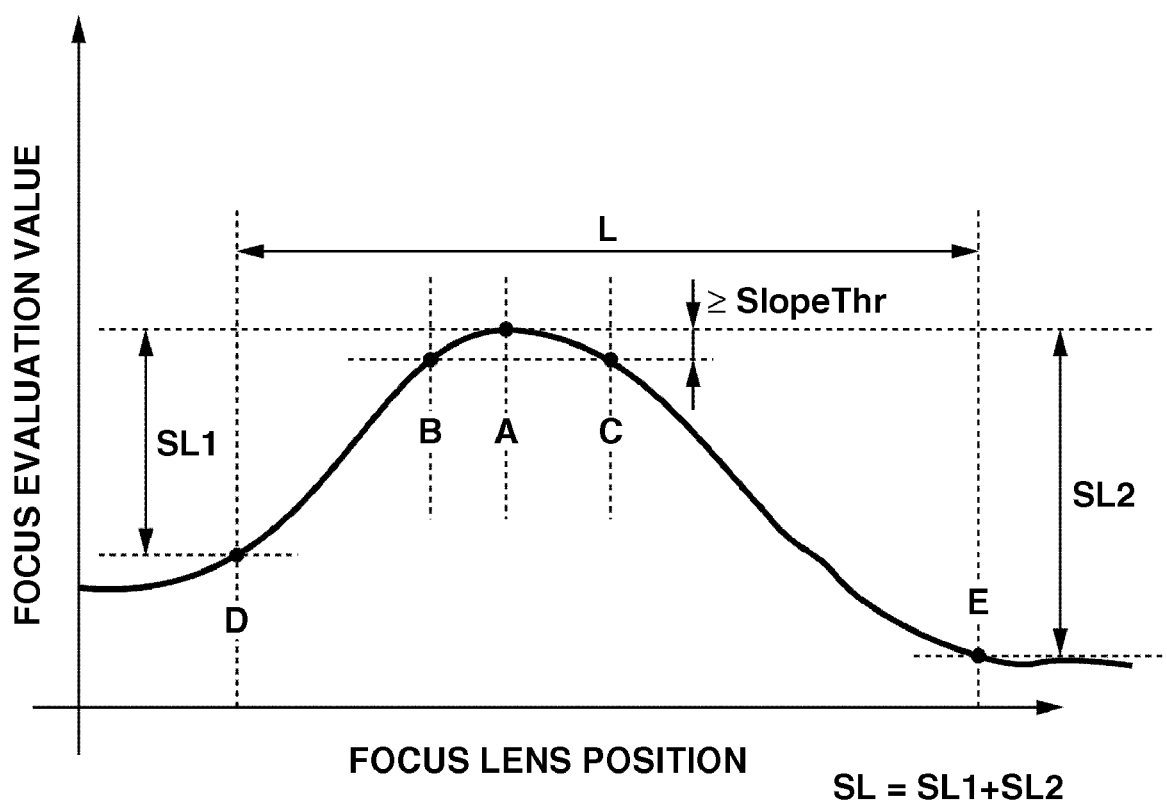
FIG. 17 illustrates in-focus determination processing.

In FIG. 17, the horizontal axis represents the focus lens position and the vertical axis represents the focus evaluation value. Generally, the graph of the focus evaluation is hill-shaped as shown in FIG. 17 except for a special case, such as a near-far composition. whether the focus evaluation value exhibits a hill shape can be determined according to the difference between the maximum value and the minimum value of the focus evaluation, the length of a segment which is inclined at a slope of a predetermined value (SlopeThr) or more, and the slope of the inclined segment. The in-focus determination is performed by this processing. The result of the in-focus determination is output as "O" or "X" described below.

O : Focus adjustment of the object can be performed from a position corresponding to the peak position of the focus evaluation value.

X: The contrast of the object is insufficient or an object is located in an area other than the scanned area.

As illustrated in FIG. 17, points to which the inclination from the top of the hill (point A) continues are defined as points D and E, the distance between the points D and E is defined as the width of the hill L, the difference between the focus evaluation values at the points A and D is defined as SL1, the difference between the focus evaluation values at the points A and E is defined as SL2, and the sum of SL1 and SL2 is defined as SL.

Figure 10:
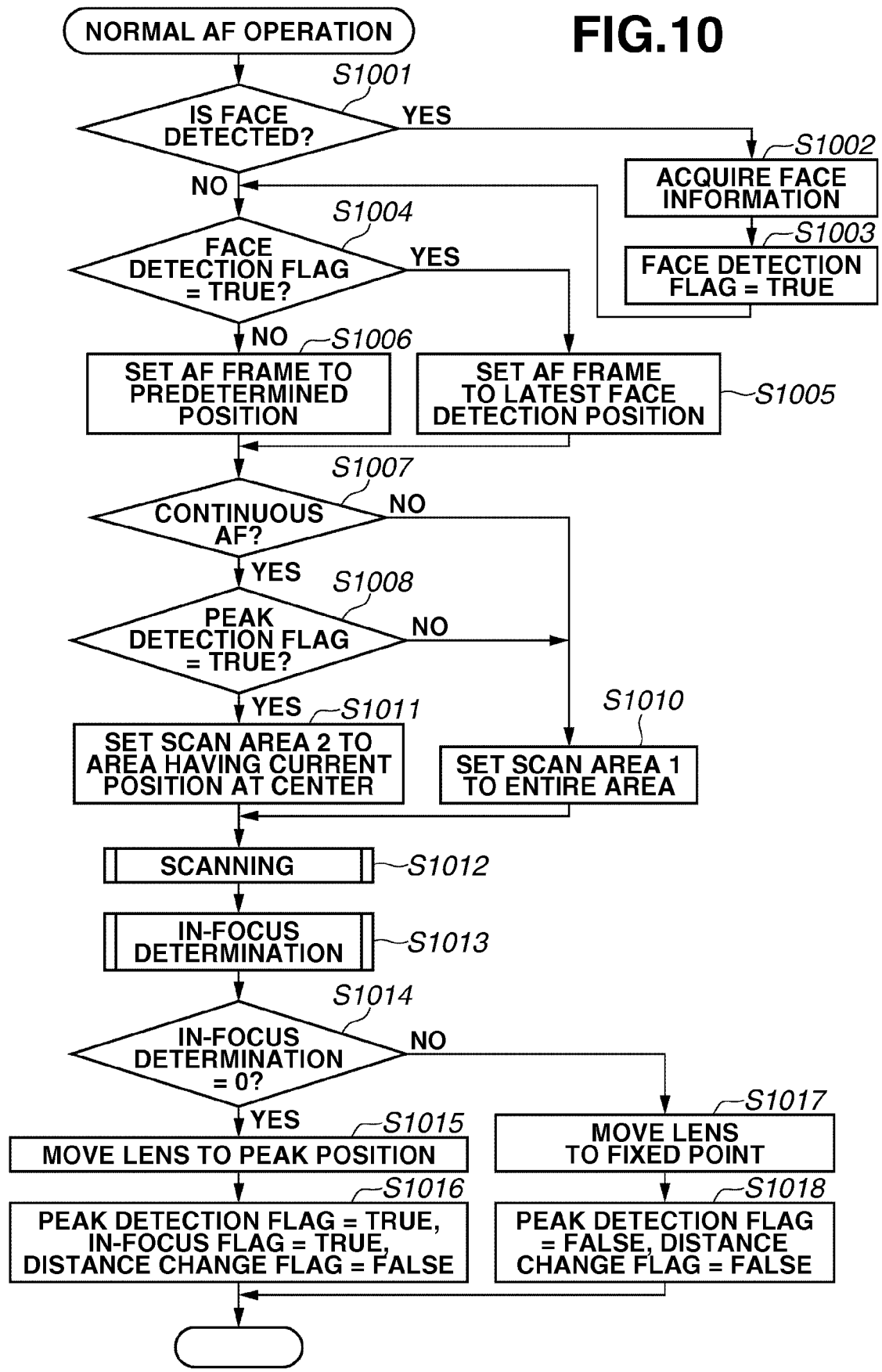
FIG. 10 is a flowchart illustrating normal AF operation processing.
Figure 11B:
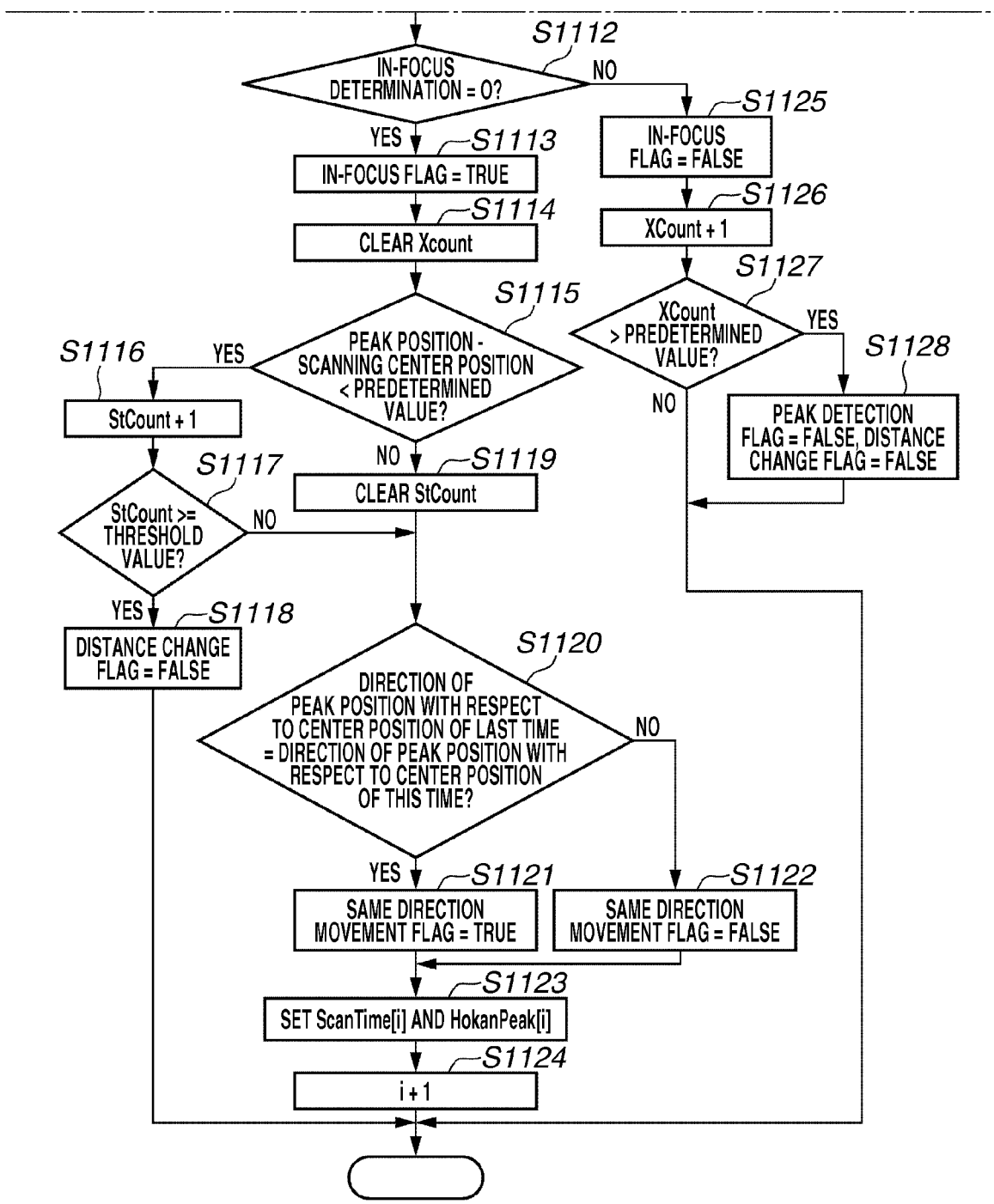
FIG. 11, composed of FIGS. 11A and 11B, is a flowchart illustrating continuous servo AF operation processing.
Figure 12:
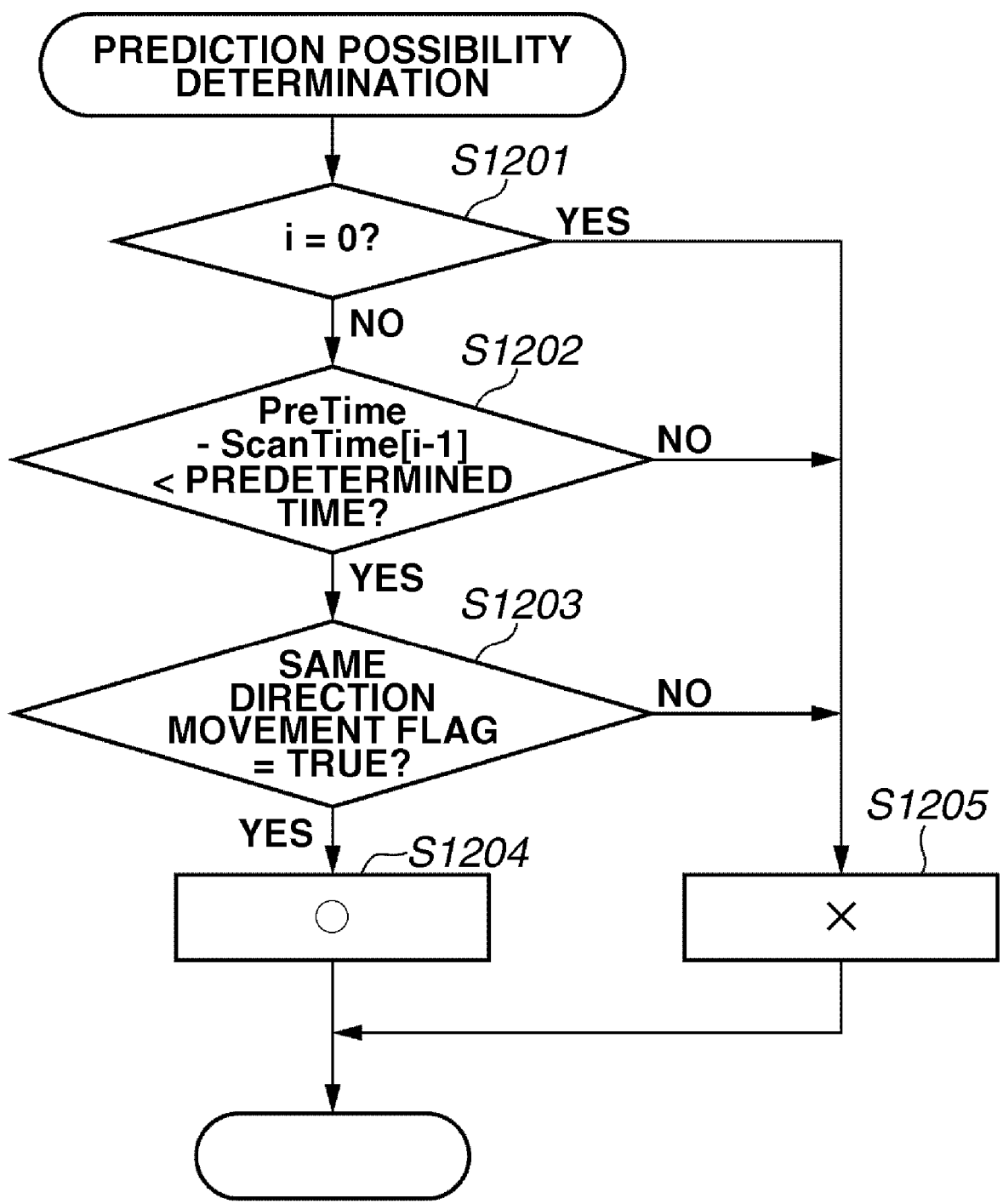
FIG. 12 is a flowchart illustrating prediction possibility determination processing.
Figure 16:
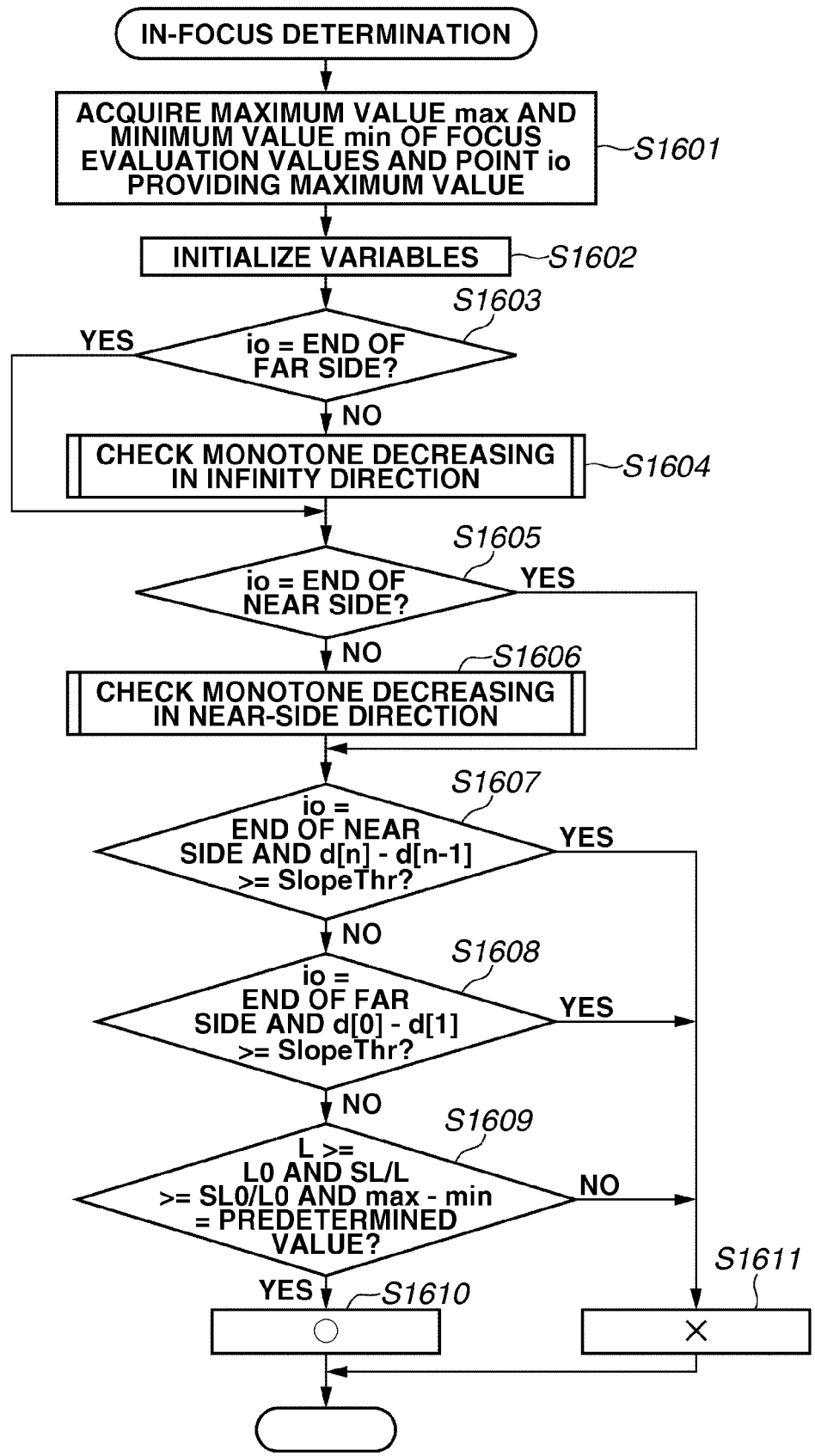
FIG. 16 is a flowchart illustrating in-focus determination processing.

FIG. 16 is a flowchart of a subroutine of the in-focus determination in step S1013 of the flowchart in FIG. 10 and step S1111 of the flowchart in FIG. 11.

In step S1601, the system control unit 112 acquires a maximum value and a minimum value of the focus evaluation values as well as a scan point "io" where the focus evaluation value is maximum, and the processing proceeds to step S1602. In step S1602, the system control unit 112 sets (initializes) both the variable L that indicates the width of the hill of the focus evaluation and the variable SL that indicates the inclination of the hill to zero, and the processing proceeds to step S1603.

In step S1603, the system control unit 112 determines whether the scan point io where the focus evaluation value is maximum is positioned at the end of the far side of the predetermined area where the scanning has been performed. If the scan point io is not at the end of the far side (NO in step S1603), then the processing proceeds to step S1604. In step S1604, the system control unit 112 checks the monotone decreasing in the infinite direction. In step S1603, if the scan point io is at the end of the far side position (YES in step S1603), then step S1604 is skipped and the processing proceeds to step S1605.

In step S1605, the system control unit 112 determines whether the scan point io where the focus evaluation value is maximum is positioned at the end of near side of the predetermined area where the scanning has been performed. If the scan point io is not at the end of the near side (NO in step S1605), then the processing proceeds to step S1606. In step S1606, the system control unit 112 checks the monotone decreasing in the near side direction. In step S1605, if the scan point io is at the end of the near side (YES in step S1605), then step S1606 is skipped and the processing proceeds to step S1607.

When the checking processing of the monotone decreasing in the infinite direction and the near side direction is completed, the system control unit 112 makes the O x determination by determining whether the obtained focus evaluation values are hill shaped and comparing the various coefficients with their threshold values. In step S1607, the system control unit 112 determines whether the scan point io where the focus evaluation value is maximum is at the end of the near side of the predetermined area where the scanning has been performed, and further, whether a difference between a focus evaluation value d[n] with respect to a scan point n at the end of the near side and a focus evaluation value d[n−1] with respect to a scan point n−1, which is one scan point closer to the infinity end, is greater than or equal to the predetermined value SlopeThr. If the scan point io is at the end of the near side and the difference is greater than or equal to the SlopeThr (YES in step S1607), the processing proceeds to step S1611. If not (NO in step S1607), the processing proceeds to step S1608.

In step S1608, the system control unit 112 determines whether the scan point io where the focus evaluation value is maximum is at the end of the far side of the predetermined area where the scanning has been performed, and further, whether a difference between a focus evaluation value d[0] with respect to a scan point 0 at the end of the far side and a focus evaluation value d[1] with respect to a scan point 1, which is one scan point closer to the near side, is greater than or equal to the predetermined value SlopeThr. If the scan point io is at the end of the far side and the difference is greater than or equal to the SlopeThr (YES in step S1608), the processing proceeds to step S1611. If not (NO in step S1608), the processing proceeds to step S1609.

In step S1609, the system control unit 112 determines whether the length L being the length of a segment which is inclined at a slope of the predetermined value or more is a predetermined value Lo or more, and a mean value SL/L of the inclination of the inclined segment is greater than or equal to predetermined value SLo/Lo, and the difference between the maximum value and the minimum value of the focus evaluation is greater than or equal to a predetermined value. If the determination is determined as TRUE (YES in step S1609), the processing proceeds to step S1610. If the determination is determined as FALSE (NO in step S1609), the processing proceeds to step S1611.

In step S1610, since the obtained focus evaluation is hill-shaped and the focus adjustment of the object is possible, the determination result is O. In step S1611, since the obtained focus evaluation is not hill-shaped and the focus adjustment of the object is not possible, the determination result is X. The in-focus determination in step S1013 of the flowchart in FIG. 10 and step S1111 of the flowchart in FIG. 11 is performed in this manner.

Figure 18:
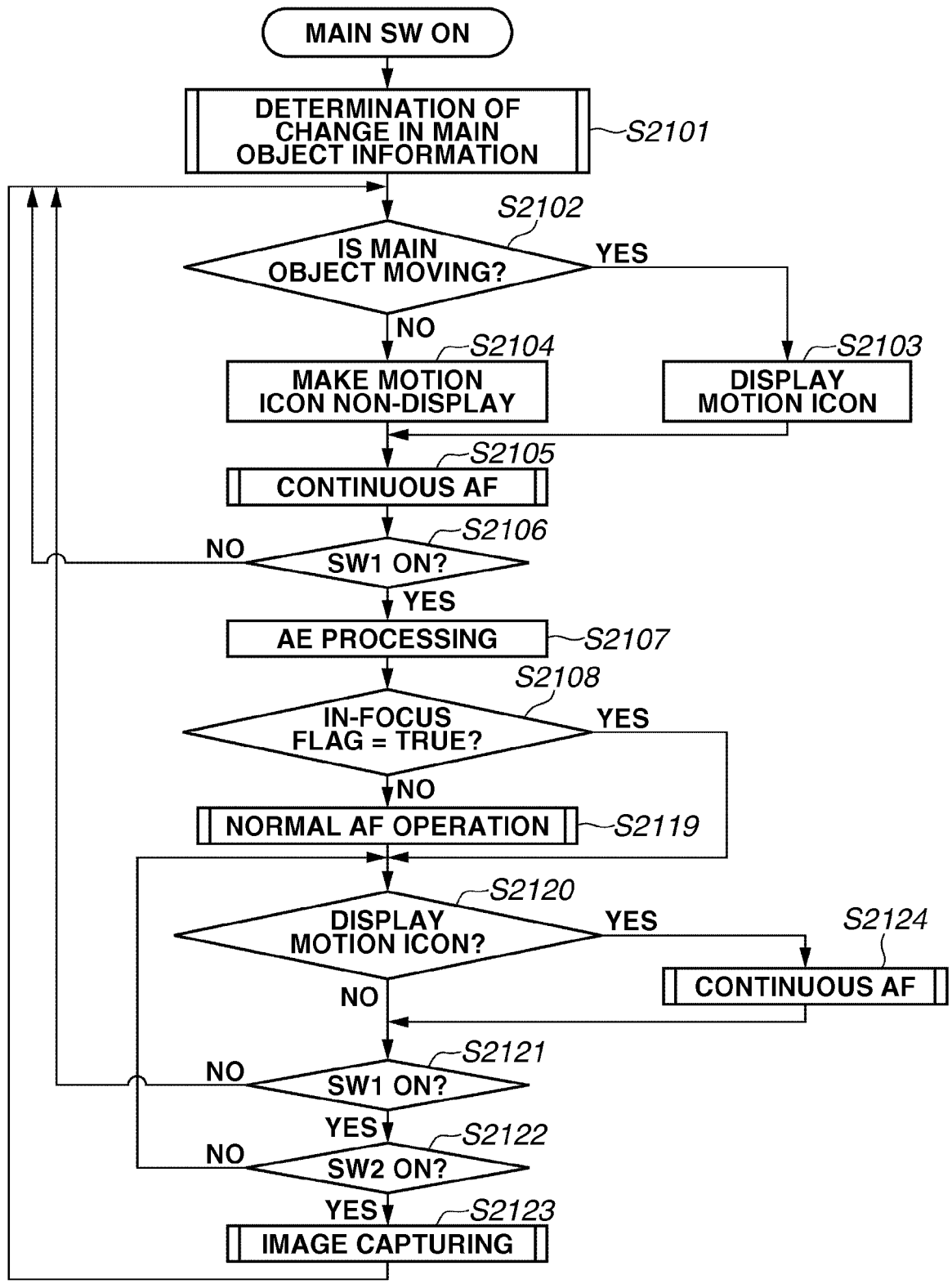
FIG. 18 is a flowchart illustrating operation of an electronic camera according to a second exemplary embodiment of the present invention.
Figure 19:
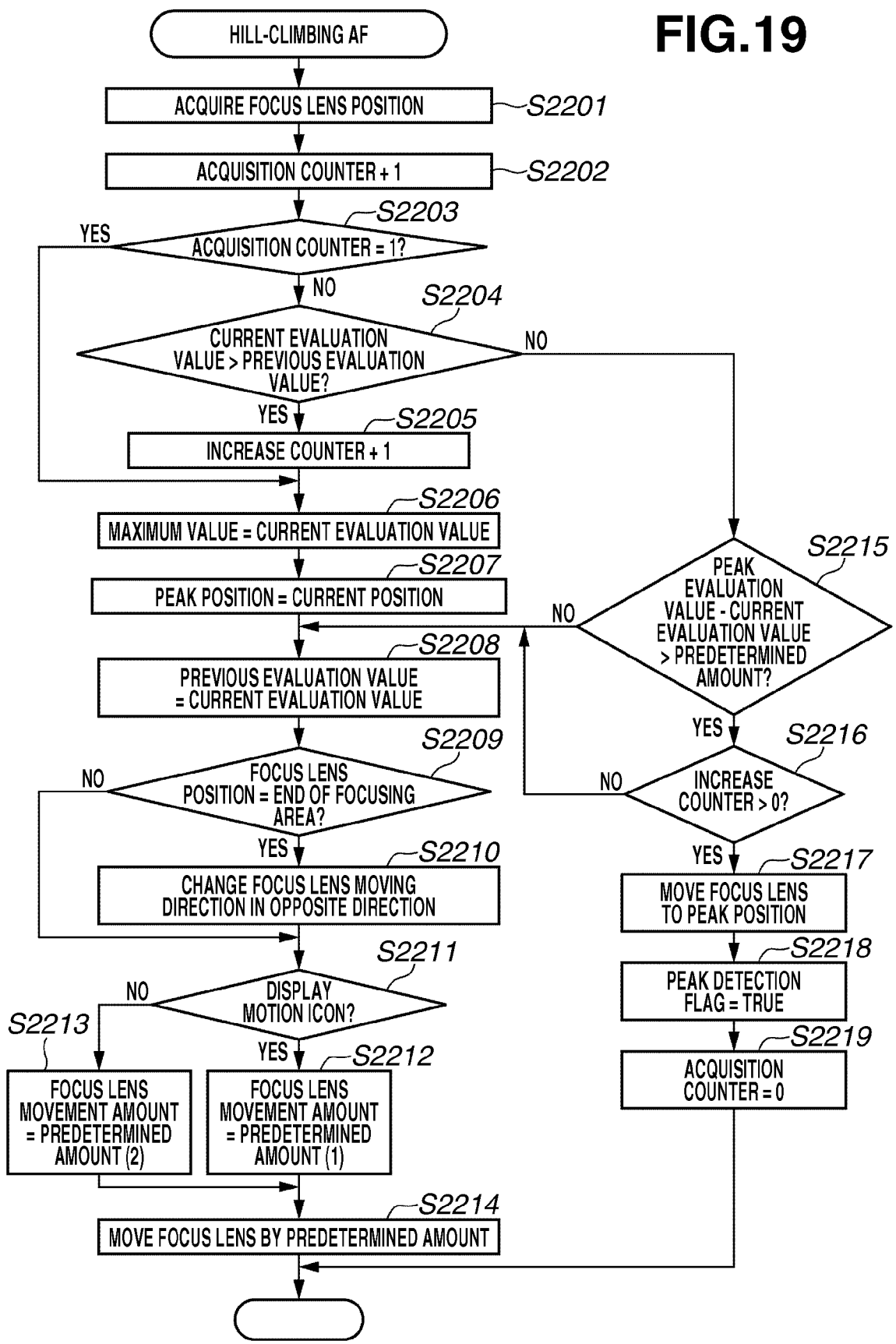
FIG. 19 is a flowchart illustrating processing of hill-climbing AF during continuous AF according to the second exemplary embodiment of the present invention.

A second exemplary embodiment of the present invention will be described in detail with reference to FIGS. 18 and 19. FIG. 18 is a flowchart illustrating an operation of the electronic camera according to the second exemplary embodiment of the present invention. The configuration of the electronic camera is similar to the configuration illustrated in FIG. 1.

First, when the user turns on the main switch 117, the processing proceeds to step S2101. In step S2101, the system control unit 112 determines whether a change has occurred in the main object according to the flowchart in FIG. 3. In step S2102, the system control unit 112 determines whether the main object is determined as moving according to a subroutine in step S2101. If the main object is determined as moving (YES in step S2102), the processing proceeds to step S2103. If not (NO in step S2102), then the processing proceeds to step S2104.

In step S2103, the system control unit 112 displays a motion icon, which indicates that the main object is moving, at a predetermined position on a screen, and the processing proceeds to step S2105. In step S2104, if a motion icon indicating that the main object is moving is displayed at a predetermined position on the screen, the system control unit 112 makes the motion icon non-display, and the processing proceeds to step S2105. In step S2105, the system control unit 112 performs the continuous AF processing according to the flowchart in FIG. 6, and the processing proceeds to step S2106.

In step S2106, the system control unit 112 determines the state of the switch SW1. If the switch SW1 is ON (YES in step S2106), the processing proceeds to step S2107. If not (NO in step S2106), the processing returns to step S2102. In step S2107, the system control unit 112 instructs the AE processing unit 103 to perform the AE processing of the output of the image processing unit 108, and the processing proceeds to step S2108. In step S2108, the system control unit 112 determines the state of the in-focus flag. If the in-focus flag is TRUE (YES in step S2108), the processing proceeds to step S2120. If the in-focus flag is FALSE (NO in step S2109), the processing proceeds to step S2119.

In step S2119, the system control unit 112 performs a normal AF operation according to the flowchart in FIG. 10, then the processing proceeds to step S2120. In step S2120, the system control unit 112 determines whether a motion icon indicating that the main object is moving is displayed at a predetermined position on the screen. If the motion icon is displayed (YES in step S2120), the processing proceeds to step S2124. If not (NO in step S2120), the processing proceeds to step S2121.

Figure 6:
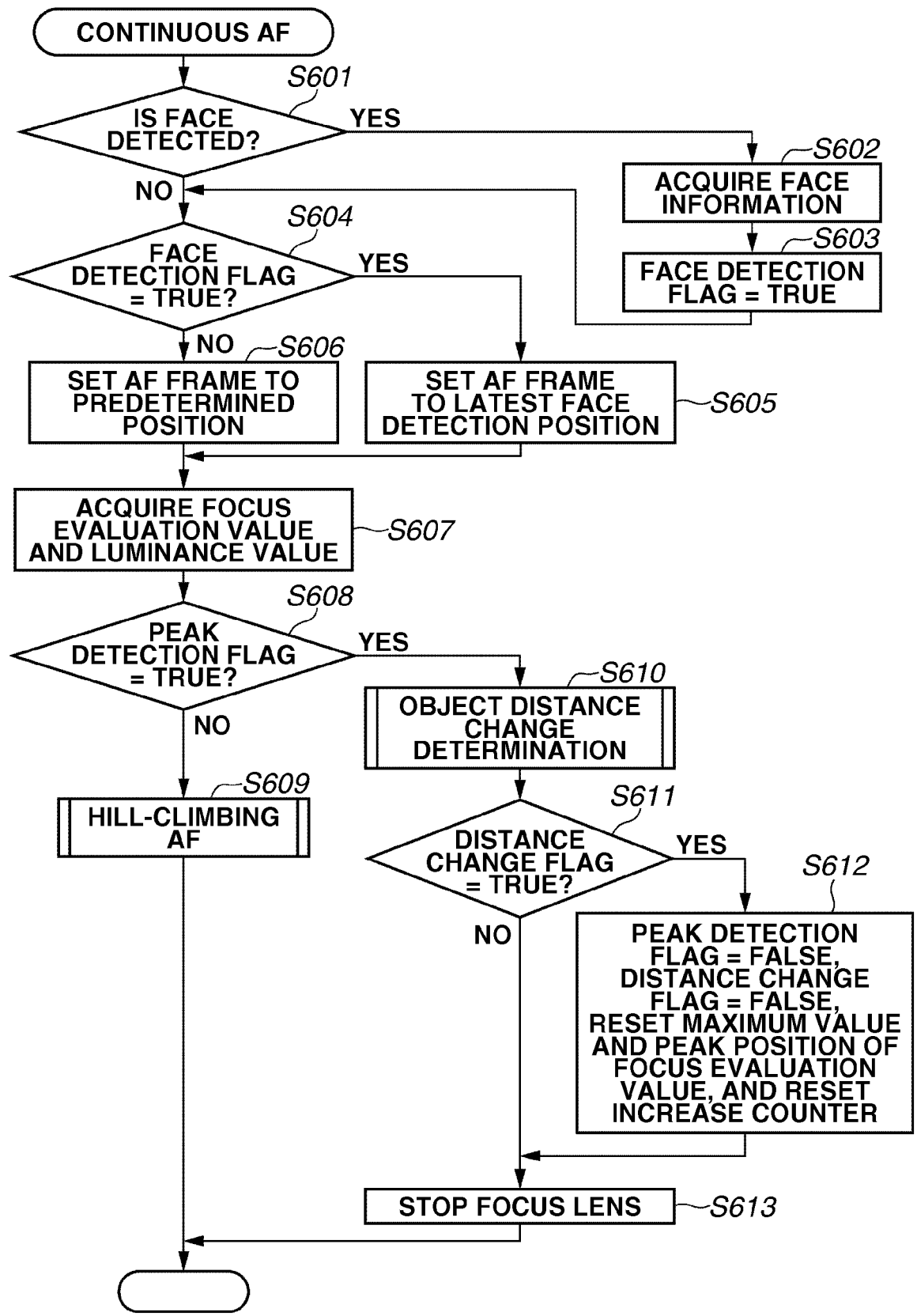
FIG. 6 is a flowchart illustrating continuous AF processing.

In step S2124, the system control unit 112 performs the continuous AF processing according to the flowchart in FIG. 6, and the processing proceeds to step S2121. In step S2121, the system control unit 112 determines the state of the switch SW1. If the switch is ON (YES in step S2121), the processing proceeds to step S2122. If not (NO in step S2121), the processing returns to step S2102.

In step S2122, the system control unit 112 determines the state of the switch SW2. If the switch is ON (YES in step S2122), the processing proceeds to step S2123. If not (NO in step S2122), the processing returns to step S2120.

Next, the hill-climbing AF performed in continuous AF operation according to the second exemplary embodiment will be described with reference to the flowchart in FIG. 19.

In step S2201, the system control unit 112 acquires a current position of the focus lens 104, and the processing proceeds to step S2202. In step S2202, the system control unit 112 increments an acquisition counter by 1, and the processing proceeds to step S2203. The acquisition counter is used for counting a number of times a focus evaluation value, a luminance value, or a current position of the focus lens 104 has been acquired. The acquisition counter is set to 0 in advance according to an initialization operation (not shown).

In step S2203, the system control unit 112 determines whether the value of the acquisition counter is 1. If the value of the acquisition counter is 1 (YES in step S2203), the processing proceeds to step S2206. If the value of the acquisition counter is not 1 (NO in step S2203), the processing proceeds to step S2204. In step S2204, the system control unit 112 determines whether the "current focus evaluation value" is greater than the "previous focus evaluation value". If the "current focus evaluation value" is greater than the "previous focus evaluation value" (YES in step S2204), the processing proceeds to step S2205. If not (NO in step S2204), the processing proceeds to step S2215.

In step S2205, the system control unit 112 increments an increase counter, which indicates that the "current focus evaluation value" is greater than the "previous focus evaluation value" by 1, and the processing proceeds to step S2206. This increase counter is set in advance to 0 by initialization operation (not shown). In step S2206, the system control unit 112 stores the current focus evaluation value as the maximum value of the focus evaluation values in a calculation memory (not shown) in the system control unit 112, and the processing proceeds to step S2207.

In step S2207, the system control unit 112 stores the current position of the focus lens 104 as the peak position of the focus evaluation value in a calculation memory (not shown) in the system control unit 112, and the processing proceeds to step S2208. In step S2208, the system control unit 112 stores the current focus evaluation value as the previous focus evaluation value in a calculation memory (not shown) in the system control unit 112, and the processing proceeds to step S2209.

In step S2209, the system control unit 112 determines whether the current position of the focus lens 104 is at the end of the focusing area. If the current position is at the end of the focusing area (YES in step S2209), the processing proceeds to step S2210. If the current position is not at the end of the focusing area (NO in step S2209), the processing proceeds to step S2211.

In step S2210, the system control unit 112 changes the moving direction of the focus lens 104 to the opposite direction, and the processing proceeds to step S2211. In step S2211, the system control unit 112 determines whether a motion icon indicating that the main object is moving is displayed at a predetermined position on the screen. If the motion icon is displayed (YES in step S2211), the processing proceeds to step S2212. If not (NO in step S2211), the processing proceeds to step S2213.

In step S2212, the system control unit 112 sets the predetermined amount by which the focus lens is driven to a predetermined amount (1), and the processing proceeds to step S2214. The predetermined amount (1) is set to such an amount that focus tracking is possible even if the object moves a great deal toward or away from the camera. In step S2213, the system control unit 112 sets the predetermined amount by which the focus lens is driven to a predetermined amount (2) different from the predetermined amount (1), and the processing proceeds to step S2214. The predetermined amount (2) is set to a smaller amount than the predetermined amount (1) so that the quality of a live image is not reduced by change in focus.

In step S2214, the system control unit 112 moves the focus lens 104 by the predetermined amount, and the processing of the subroutine ends. Then, the processing proceeds to step S2106 or step S2121 in FIG. 18. According to the above-described processing, the drive amount of the focus lens 104 per unit time can be changed according to whether the main object is moving.

In step S2215, the system control unit 112 determines whether "the maximum value of the focus evaluation values—the current focus evaluation value" is greater than a predetermined amount. If the obtained value is greater than the predetermined amount (YES in step S2215), the processing proceeds to step S2216. If not (NO in step S2215), the processing proceeds to step S2208. If "the maximum value of the focus evaluation values—the current focus evaluation value" is greater than the predetermined amount, in other words, if the predetermined amount or more is decreased from the maximum value, the maximum value is considered as the value of the peak position of the focus evaluation value. In step S2216, the system control unit 112 determines whether the count of the increase counter is greater than 0. If the count of the increase counter is greater than 0 (YES in step S2216), the processing proceeds to step S2217. If not (NO in step S2216), the processing proceeds to step S2208.

In step S2217, the system control unit 112 moves the focus lens 104 to the peak position corresponding to the maximum value of the focus evaluation value stored in step S2207, and the processing proceeds to step S2218. In step S2218, the system control unit 112 sets the peak detection flag to TRUE, and the processing proceeds to step S2219. In step S2219, the system control unit 112 sets the acquisition counter to 0, and the processing proceeds to step S2106 or S2121 in FIG. 18.

According to the above-described exemplary embodiments, the continuous AF is executed if motion of the object image is not detected and the servo AF is executed if motion of the object image is detected. Thus, focus tracking on an object without reducing quality of a live image can be performed. The present invention is not limited to the above-described exemplary embodiments, and various changes and modifications can be applied so long as they fall within the scope of the present invention. For example, information indicating change (motion) of a main object detected in step S201 or S2101 can be displayed and controlled on a monitor screen.

Further, the above-described exemplary embodiments can also be achieved by supplying a software program that realizes each function of aforementioned exemplary embodiments to a system or an apparatus via a network or various types of storage media, and a computer (or a CPU or a MPU) in the system or the apparatus reads and executes the program stored in such storage media.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-189496 filed Aug. 18, 2009, which is hereby incorporated by reference herein in its entirety.

What is claimed is:

1. A focus adjustment apparatus comprising:
   an imaging unit configured to capture an object image input via a focus lens to output image data;
   a focus adjustment unit configured to perform focus adjustment by controlling a position of the focus lens based on focus evaluation value of the image data;
   a motion detection unit configured to detect a motion of the object image based on the image data; and
   a control unit configured to control the focus adjustment unit to perform a first focus adjustment operation if it is not satisfying a predetermined condition, and to control the focus adjustment unit to perform a second focus adjustment operation different from the first focus adjustment operation if it is satisfying the predetermined condition,
   wherein the predetermined condition includes a condition that motion of the object image is detected by the motion detection unit, and
   wherein the control unit controls the focus adjustment unit so as to, in the first focus adjustment operation, determine movement direction of the focus lens according to a comparison result of current focus evaluation value and previous focus evaluation value and move the focus lens to the determined movement direction, and in the second focus adjustment operation, to predict a position of the object according to a plurality of in-focus positions which are previously detected and move the focus lens within a movement area which is set based on the predicted position of the object.

2. The focus adjustment apparatus according to claim 1, wherein the control unit controls the focus adjustment unit to make a movement amount of the focus lens per unit time in the second focus adjustment operation larger than in the first focus adjustment operation.

3. The focus adjustment apparatus according to claim 1, wherein the motion detection unit detects the motion of the object image by detecting a face of an object from the image data and determining a change in the face.

4. The focus adjustment apparatus according to claim 3, wherein the change in the face includes a change in position or size of the face of the object.

5. The focus adjustment apparatus according to claim 4, wherein the motion detection unit detects the motion of the object image if the position or size of the face of the object is consecutively changed in a same direction for a predetermined amount or more a predetermined number of times or more.

6. The focus adjustment apparatus according to claim 1, wherein the motion detection unit does not detect the motion of the object image during an optical zoom operation or electronic zoom operation.

7. The focus adjustment apparatus according to claim 1, wherein if a luminance of the image data is lower than or equal to a predetermined value, the control unit controls the focus adjustment unit not to perform the second focus adjustment operation but to perform the first focus adjustment operation.

8. The focus adjustment apparatus according to claim 1, further comprising a display control unit configured to, based on a result of motion detection of the object image by the motion detection unit, cause information indicating whether the object is moving to be displayed on a screen.

9. A method comprising:
   capturing an object image input via a focus lens to output image data;
   controlling a position of the focus lens based on focus evaluation value the image data;
   detecting a motion of the object image based on image data; and
   performing a first focus adjustment operation if it is not satisfying a predetermined condition, and performing a second focus adjustment operation if it is satisfying the predetermined condition,
   wherein the predetermined condition includes a condition that motion of the object image is detected, and
   wherein the controlling controls the performing the first focus adjustment operation includes determining movement direction of the focus lens according to a comparison result of current focus evaluation value and previous focus evaluation value and moving the focus lens to the determined movement direction, and
   wherein the controlling controls the performing the second focus adjustment operation includes predicting a position of the object according to a plurality of in-focus positions which are previously detected and moving the focus lens within a movement area which is set based on the predicted position of the object.

10. The method according to claim 9, further comprising controlling the focus adjustment unit to make a movement amount of the focus lens per unit time in the second focus adjustment operation larger than in the first focus adjustment operation.

11. The method according to claim 9, further comprising detecting the motion by detecting a face of an object from the image data and determining a change in the face.

12. The method according to claim 11, wherein the change in the face includes a change in position or size of the face.

13. The method according to claim 12, further comprises detecting the motion if the position or size is changed in a same direction for a predetermined amount or more a predetermined number of times or more.

14. The method according to claim 9, further comprising performing the first focus adjustment operation if a luminance of the image data is lower than or equal to a predetermined value.

15. The method according to claim 9, further comprising causing information indicating whether the object is moving to be displayed on a screen a display, based on a result of motion detection of the object image.

* * * * *